(12) United States Patent
Shivvers

(10) Patent No.: US 7,574,816 B2
(45) Date of Patent: Aug. 18, 2009

(54) COUNTER FLOW COOLING DRIER WITH INTEGRATED HEAT RECOVERY

(76) Inventor: Steve D. Shivvers, 7362 55th La., Prole, IA (US) 50229

( * ) Notice: Subject to any disclaimer, the term of this patent is extended or adjusted under 35 U.S.C. 154(b) by 7 days.

(21) Appl. No.: 11/881,779

(22) Filed: Jul. 27, 2007

(65) Prior Publication Data

US 2008/0022547 A1 Jan. 31, 2008

Related U.S. Application Data

(60) Provisional application No. 60/834,125, filed on Jul. 28, 2006, provisional application No. 60/899,964, filed on Feb. 7, 2007.

(51) Int. Cl.
*F26B 3/00* (2006.01)
*F26B 3/16* (2006.01)
(52) U.S. Cl. .............................. 34/333; 34/353; 34/418; 34/507; 34/509; 34/60; 34/72; 34/95
(58) Field of Classification Search .................. 34/333, 34/353, 356, 368, 370, 371, 373, 376–379, 34/418, 432, 467–469, 507, 509, 591, 60, 34/72–74, 77–79, 95, 165, 168–169
See application file for complete search history.

(56) References Cited

U.S. PATENT DOCUMENTS

| | | | |
|---|---|---|---|
| 1,502,858 A | 7/1924 | Little, Jr. | |
| 1,538,192 A | 5/1925 | Leach | |
| 1,711,574 A | 5/1929 | Miller | |
| 2,060,581 A | 11/1936 | Laessig | |
| 2,275,117 A | 3/1942 | Vogel-Jorgonsen | |
| 2,622,342 A | 12/1952 | Goulounes et al. | |
| 2,636,575 A | 4/1953 | Watson | |
| 2,911,198 A | 11/1959 | Karisson | |
| 3,325,912 A | 6/1967 | Bojner et al. | |
| 3,336,019 A | 8/1967 | Pryor | |

(Continued)

OTHER PUBLICATIONS

*Particulate Medium Processor* Brochure, Department of Agricultural and Biosystems Engineering Macdonald Campus of McGill University, Mar. 27, 1998.

(Continued)

*Primary Examiner*—Jiping Lu
(74) *Attorney, Agent, or Firm*—John C. McMahon

(57) ABSTRACT

A drier apparatus for removing water or other liquids from various materials includes a mixer, drying chamber, separator and regenerator and a method for use of the apparatus. The material to be dried is mixed with a heated media to form a mixture which then passes through the chamber. While passing through the chamber, a comparatively cool fluid is passed counter current through the mixture so that the mixture becomes cooler and drier and the fluid becomes hotter and more saturated with moisture. The mixture is then separated into drier material and media. The media is transferred to the regenerator and heated therein by the hot fluid from the chamber and supplemental heat is supplied to bring the media to a preselected temperature for mixing with the incoming material to be dried. In a closed loop embodiment of the apparatus, the fluid is also recycled from the regenerator to the chamber and a chiller is utilized to reduce the temperature of the fluid to a preselected temperature and dew point temperature.

42 Claims, 13 Drawing Sheets

U.S. PATENT DOCUMENTS

| | | | |
|---|---|---|---|
| 3,401,923 A | 9/1968 | Bearce | |
| 3,442,769 A | 5/1969 | Heinz | |
| 3,578,297 A * | 5/1971 | Niems | 34/169 |
| 3,629,954 A | 12/1971 | Lavalier | |
| 3,739,493 A | 6/1973 | Nivon | |
| 3,898,745 A | 8/1975 | Carlsson | |
| 3,982,326 A | 9/1976 | Squires | |
| 4,006,536 A | 2/1977 | Meiners | |
| 4,045,882 A | 9/1977 | Buffington et al. | |
| 4,067,120 A | 1/1978 | Bradford | |
| 4,086,708 A | 5/1978 | Westelaken | |
| 4,093,505 A | 6/1978 | Tsuruta et al. | |
| 4,094,633 A | 6/1978 | Peterson et al. | |
| 4,125,945 A | 11/1978 | Westelaken | |
| 4,186,755 A | 2/1980 | Schmidt | |
| 4,194,515 A | 3/1980 | Graalmann et al. | |
| 4,207,943 A | 6/1980 | Gardner et al. | |
| 4,242,084 A | 12/1980 | Jamaluddin | |
| 4,257,169 A | 3/1981 | Pierce | |
| 4,268,971 A | 5/1981 | Noyes et al. | |
| 4,320,796 A | 3/1982 | Smith | |
| 4,330,946 A | 5/1982 | Courneya | |
| 4,337,584 A | 7/1982 | Johnson | |
| 4,346,524 A | 8/1982 | Wochnowski et al. | |
| 4,351,119 A | 9/1982 | Meunier | |
| 4,372,053 A | 2/1983 | Anderson et al. | |
| 4,413,426 A | 11/1983 | Graff | |
| 4,443,332 A | 4/1984 | de Nevers | |
| 4,474,553 A | 10/1984 | Takahashi | |
| 4,490,924 A | 1/1985 | Lambert | |
| 4,509,272 A | 4/1985 | Graff | |
| 4,521,977 A | 6/1985 | Graff | |
| 4,583,468 A | 4/1986 | Reed et al. | |
| 4,676,007 A | 6/1987 | Good | |
| 4,750,274 A | 6/1988 | Erdman, Jr. et al. | |
| 4,821,428 A | 4/1989 | Good | |
| 4,862,601 A | 9/1989 | Baillie | |
| 4,870,760 A | 10/1989 | Graff | |
| 4,914,834 A | 4/1990 | Sime | |
| 4,918,837 A | 4/1990 | Graff | |
| 5,111,596 A | 5/1992 | Laurenty | |
| 5,165,471 A | 11/1992 | Atsumi | |
| 5,220,732 A | 6/1993 | Lee | |
| 5,344,229 A | 9/1994 | Nath et al. | |
| 5,440,823 A | 8/1995 | Willgohs | |
| 5,522,156 A | 6/1996 | Waro | |
| 5,551,167 A | 9/1996 | van Fossen | |
| 5,551,168 A | 9/1996 | Van Fossen | |
| 5,555,636 A | 9/1996 | Kramer et al. | |
| 5,810,471 A | 9/1998 | Nath et al. | |
| 6,135,765 A | 10/2000 | Jamaluddin | |
| 6,202,319 B1 | 3/2001 | Bening | |
| 6,230,421 B1 | 5/2001 | Reed, Sr. et al. | |
| 6,901,868 B2 | 6/2005 | Hornung et al. | |
| 7,007,402 B1 | 3/2006 | Gillette | |

OTHER PUBLICATIONS

*Guide to Industrial Drying Principles, Equipment and New Developments* Brochure, Arun S. Mujumdar, 2004.
*Engineered Solutions for Critical Production Processes* Brochure, General Kinematics, date of publication unknown.
*The Renneburg Multidisc Thermal Processor* Brochure, Heyl & Patterson, Inc., date of publication unknown.
*Fluid Bed Processing* Brochure, Niro, Inc., Jul. 2001.
*Thermal Processing* Brochure, Bepex Particle Processing Technology, 2005.
"*Holo-Scru*" *Processors* Brochure, Therma-Flite The Screw Heat Exchanger Company, date of publication unknown.
*Rosinaire* Brochure, Barr-Rosin, date of publication unknown.
*Airstream Drying* Brochure, Barr-Rosin, date of publication unknown.
*Rotary Dryers* Brochure, Barr-Rosin, date of publication unknown.
*Crystallisation & Drying Plant for high specification PET & Nylon chips* Brochure, PET & Nylon, Barr-Rosin, date of publication unknown.
*Sugar & Sweeteners Drying & Cooling Plant for Beet, Cane & Special Sugars* Brochure, Barr-Rosin, date of publication unknown.
*Dryers & Coolers, Indirect Cooler* Brochure, FMC Technologies, Inc., date of publication unknown.
*Dryers & Coolers, Coal Dryer* Brochure, FMC Technologies, Inc., date of publication unknown.
*Dryers & Coolers, Dryer or Cooler* Brochure, FMC Technologies, Inc., date of publication unknown.
*Dryers & Coolers, Dryer & Cooler* Brochure, FMC Technologies, Inc., date of publication unknown.
*Heating & Cooling Powder and Bulk Solids* Brochure, Bulkflow The Better Solution, Apr. 2003.
*Why the Wyssmont Turbo-Dryer is best* Brochure, Wyssmont Co., Inc., 2000.
*Krauss-Maffei Plate Dryers*, kmpt process technology, date of publication unknown.
*Drying Technologies, Integrated Systems for Solid-/Liquid Separation from liquid Suspensions to dry Products* Brochure, Terhmal PRocess Tehcnologies, Andritz, date of publication unknown.
*Fluid Bed Thermal Physical Process Technology*, Ventilex, date of publication unknown.
*Energy Conservation in Grain Driers II: A Two-Stage Recirculating Counterflow Dryer* Article, M.D. Roth, et al., Sep. 9-12, 1973.
*Energy Requirements for a Two-Stage Recirculating Counterflow Grain Dryer* Article, Bakker-Arkema, et al. Jun. 23-26, 1974.

* cited by examiner

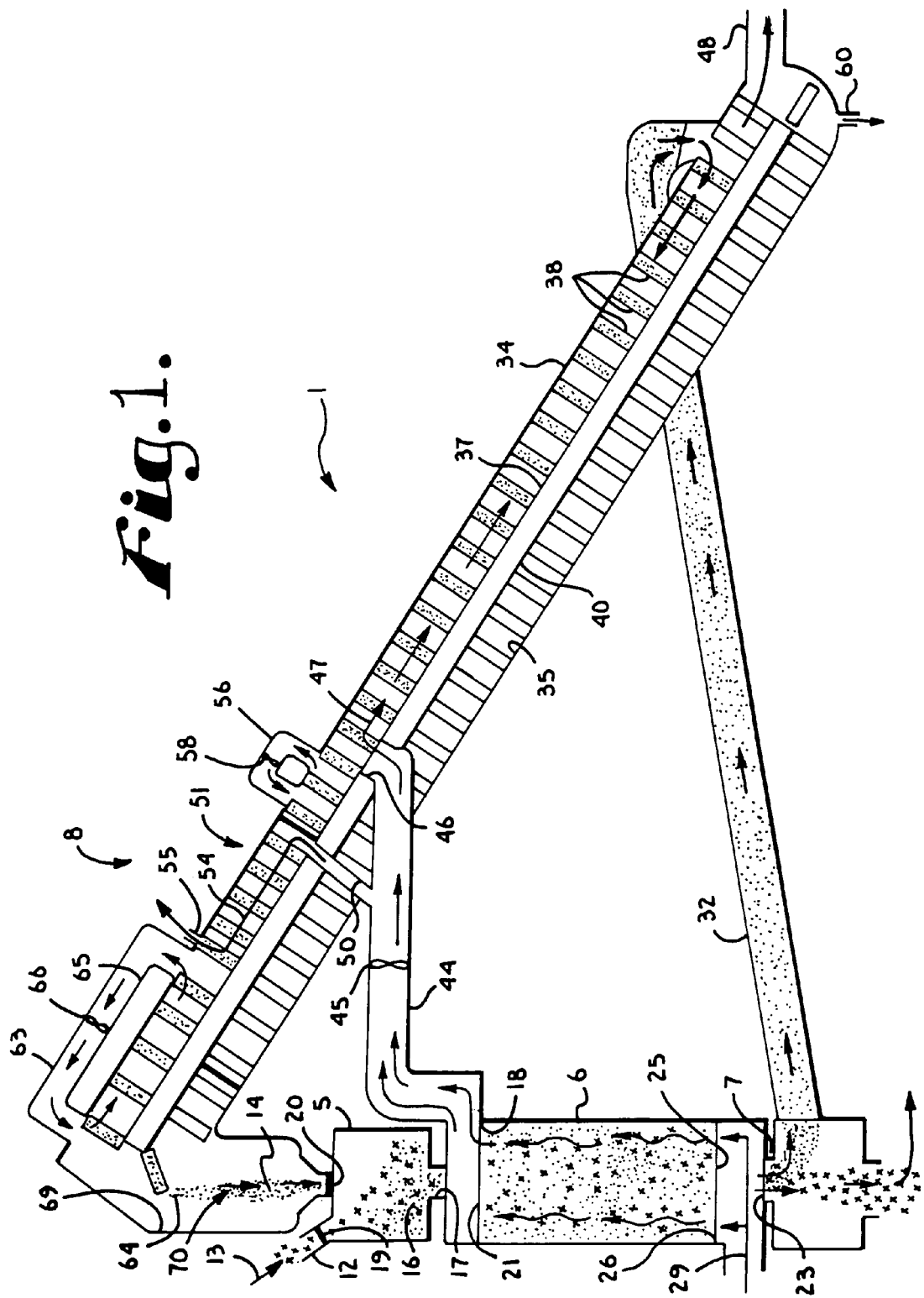

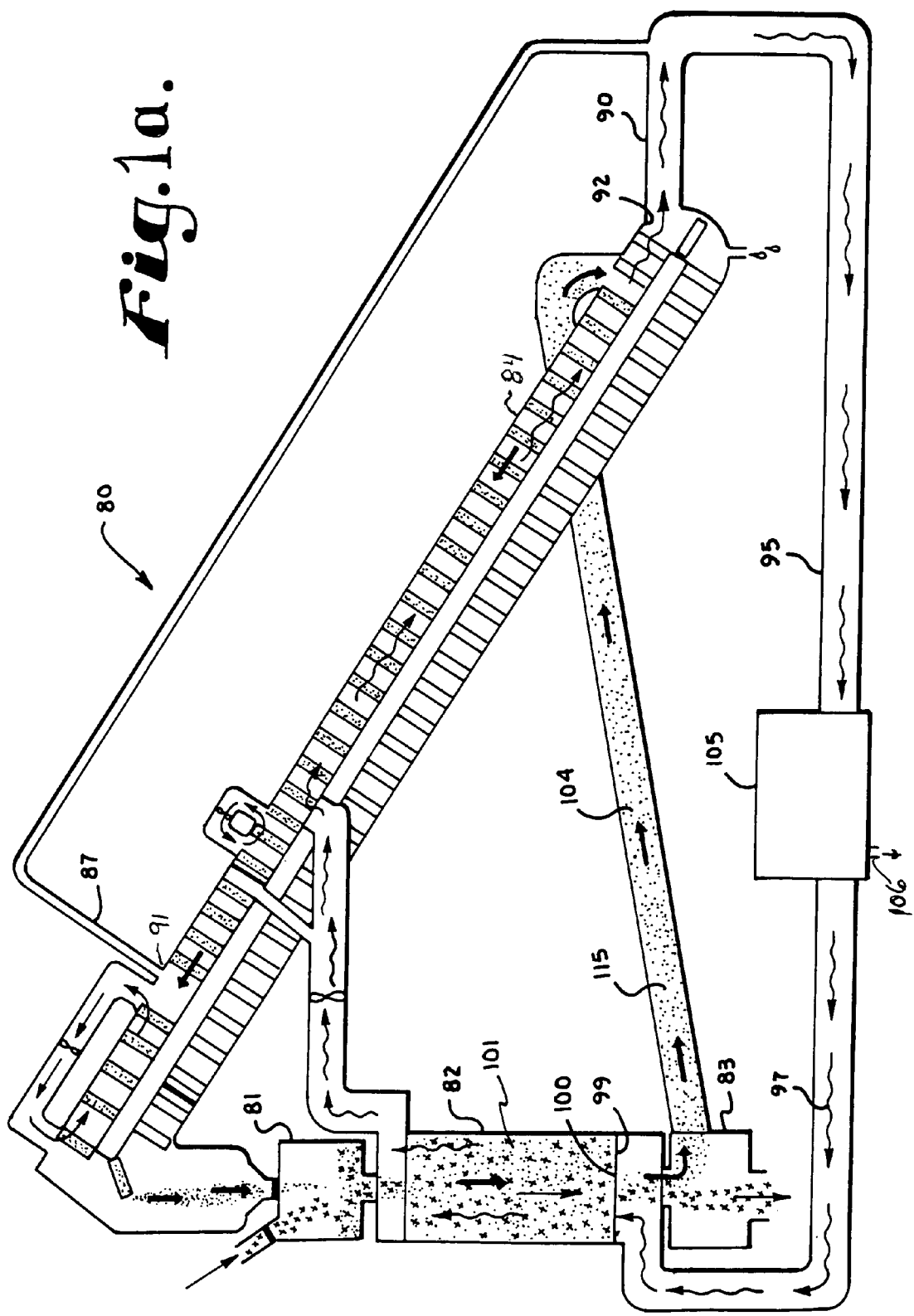

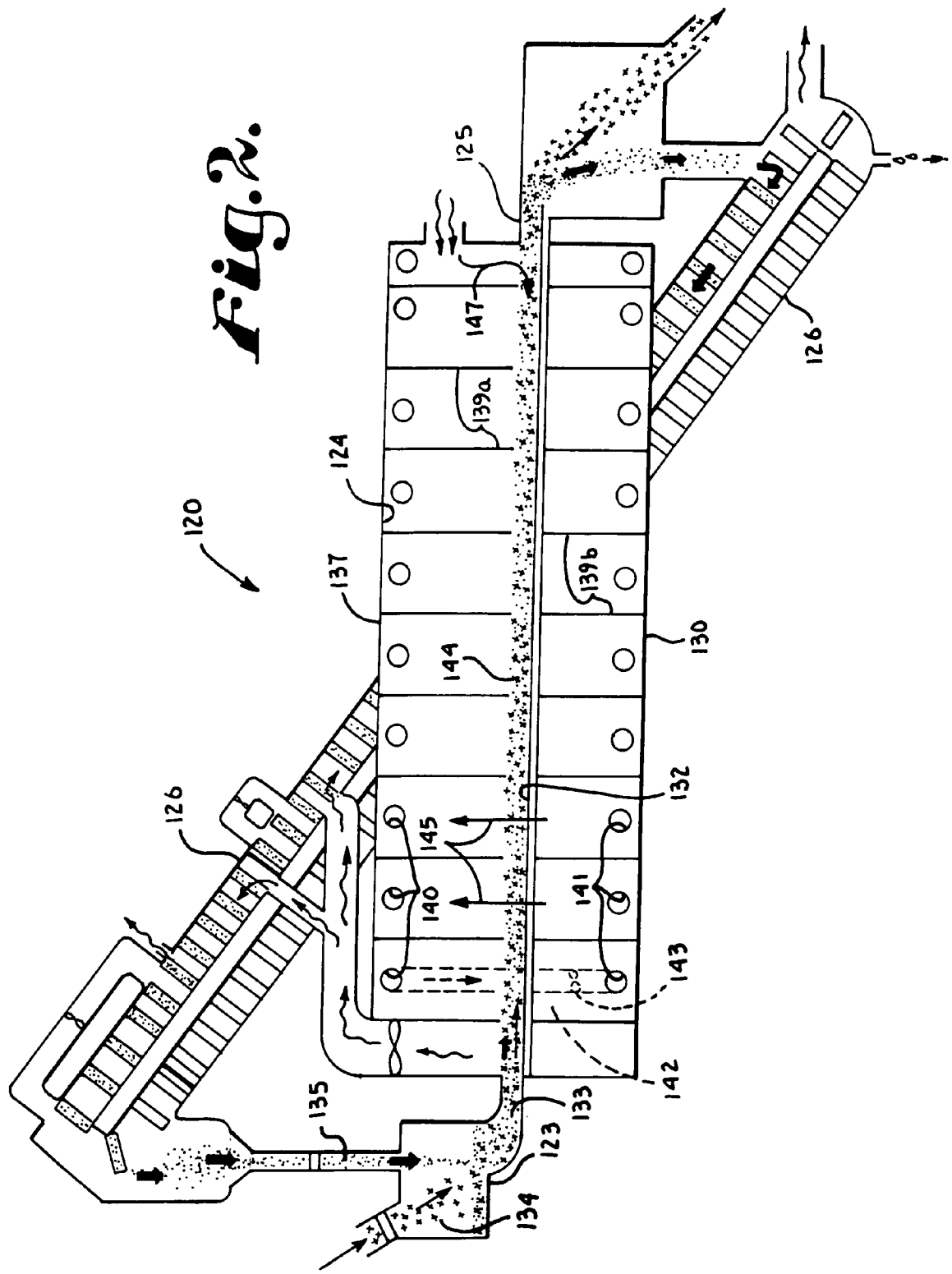

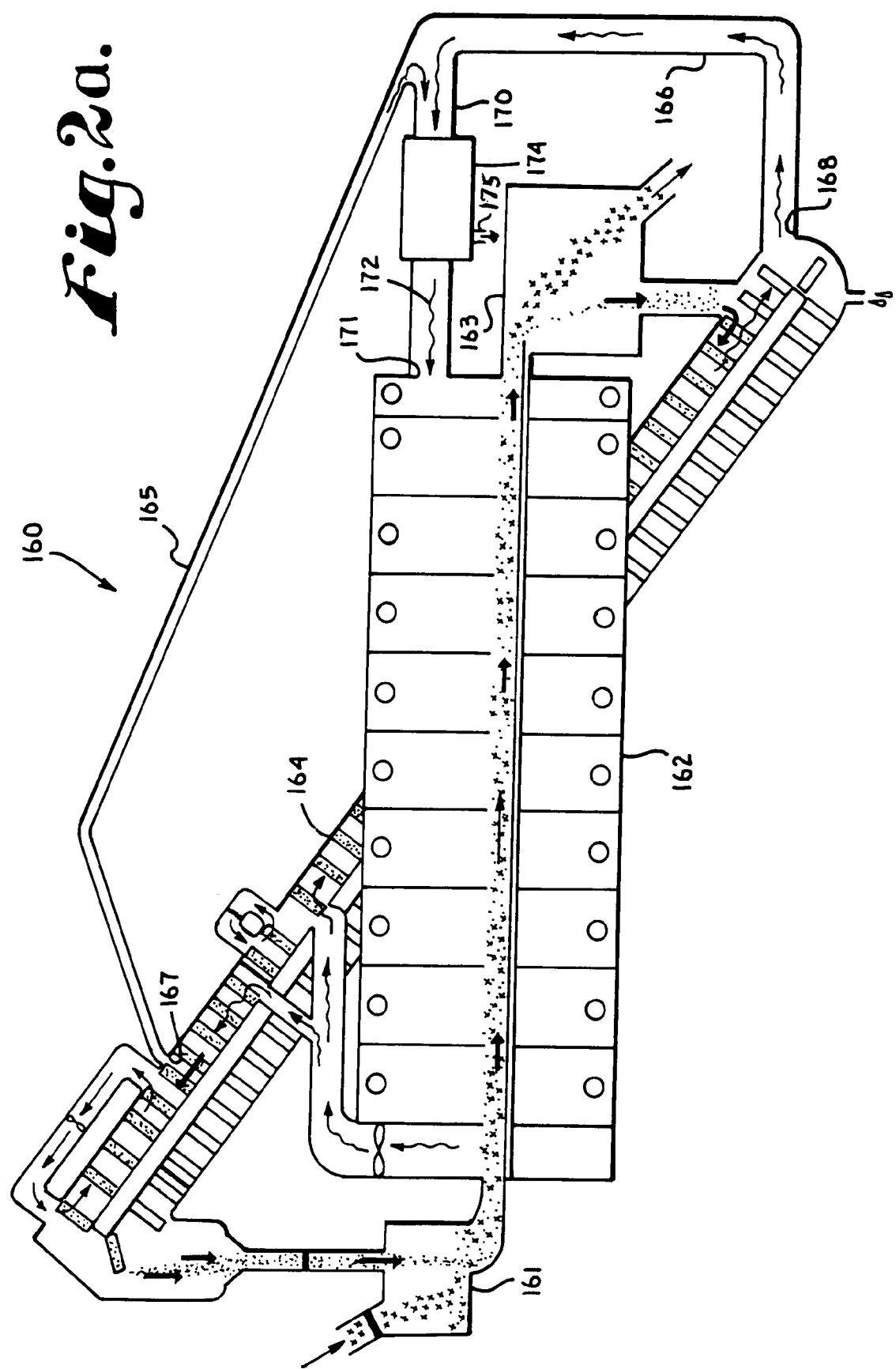

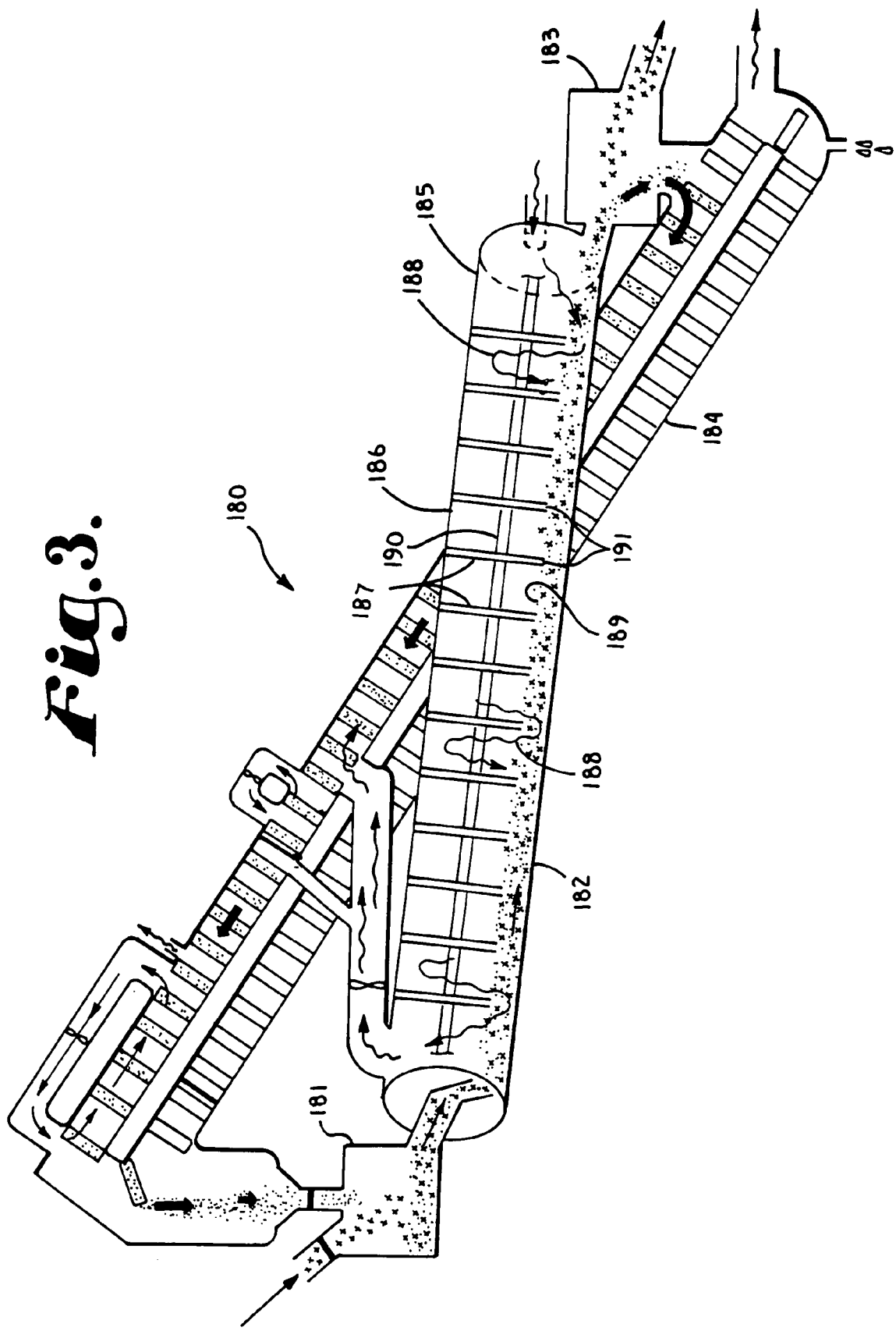

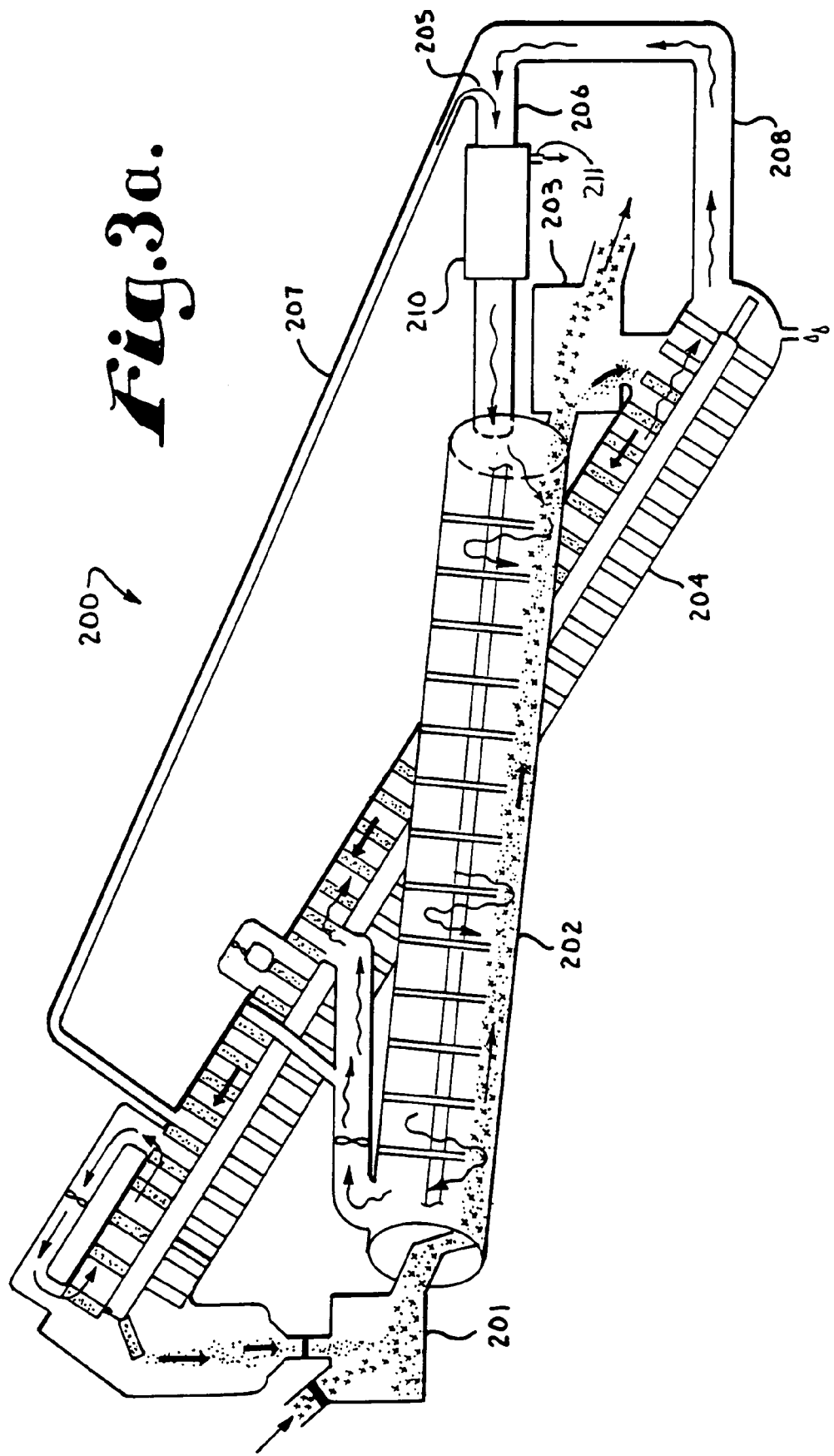

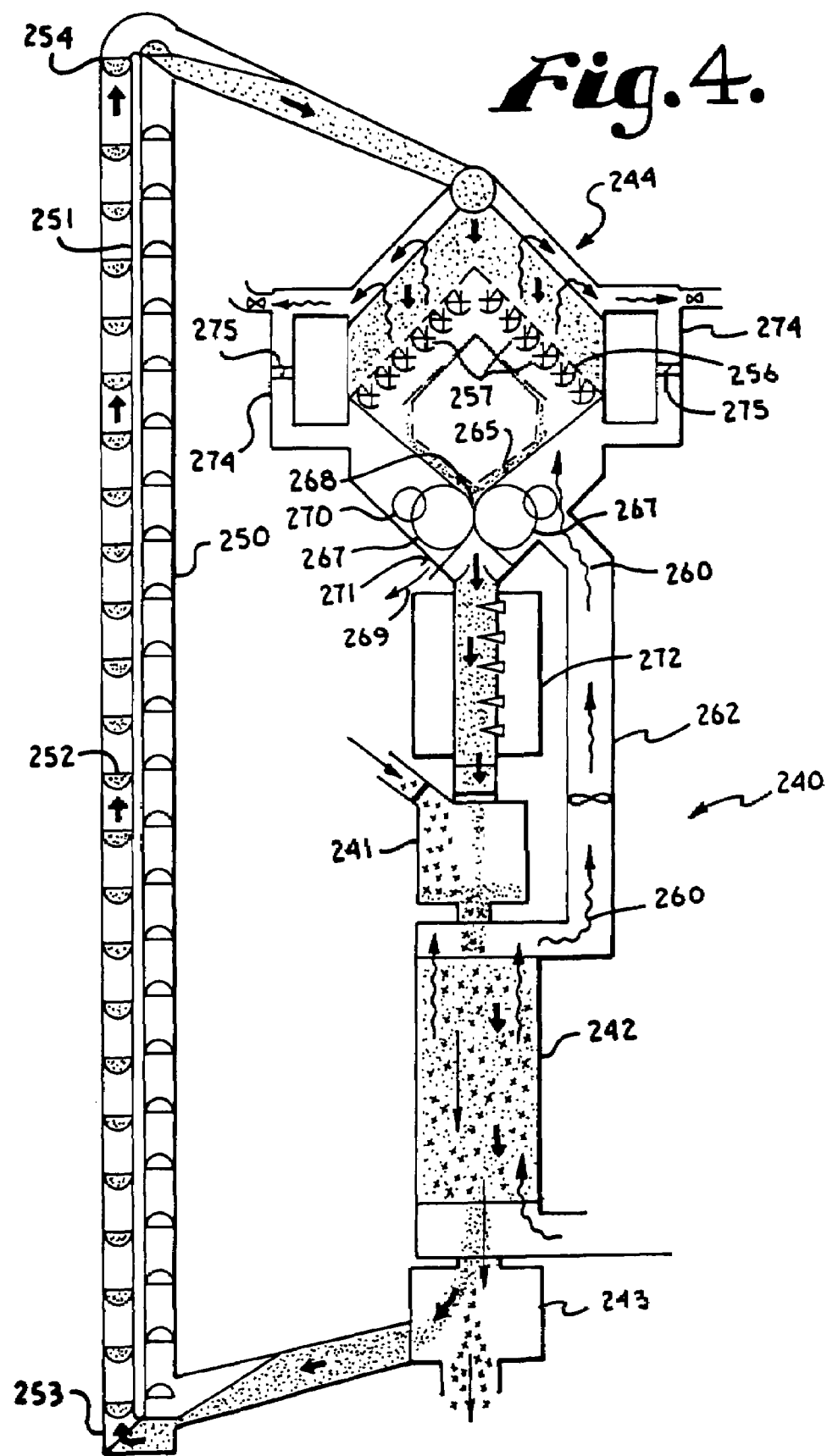

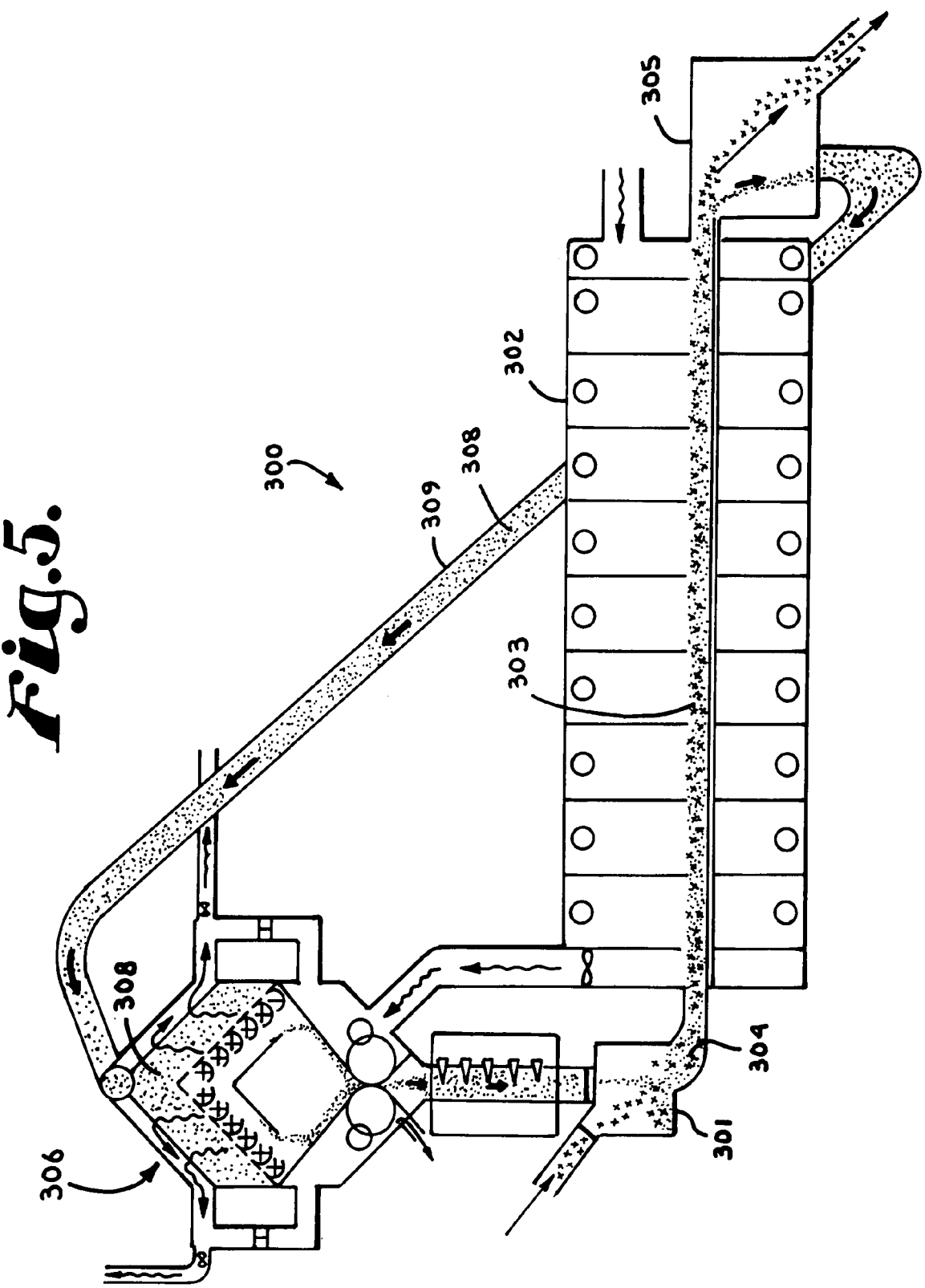

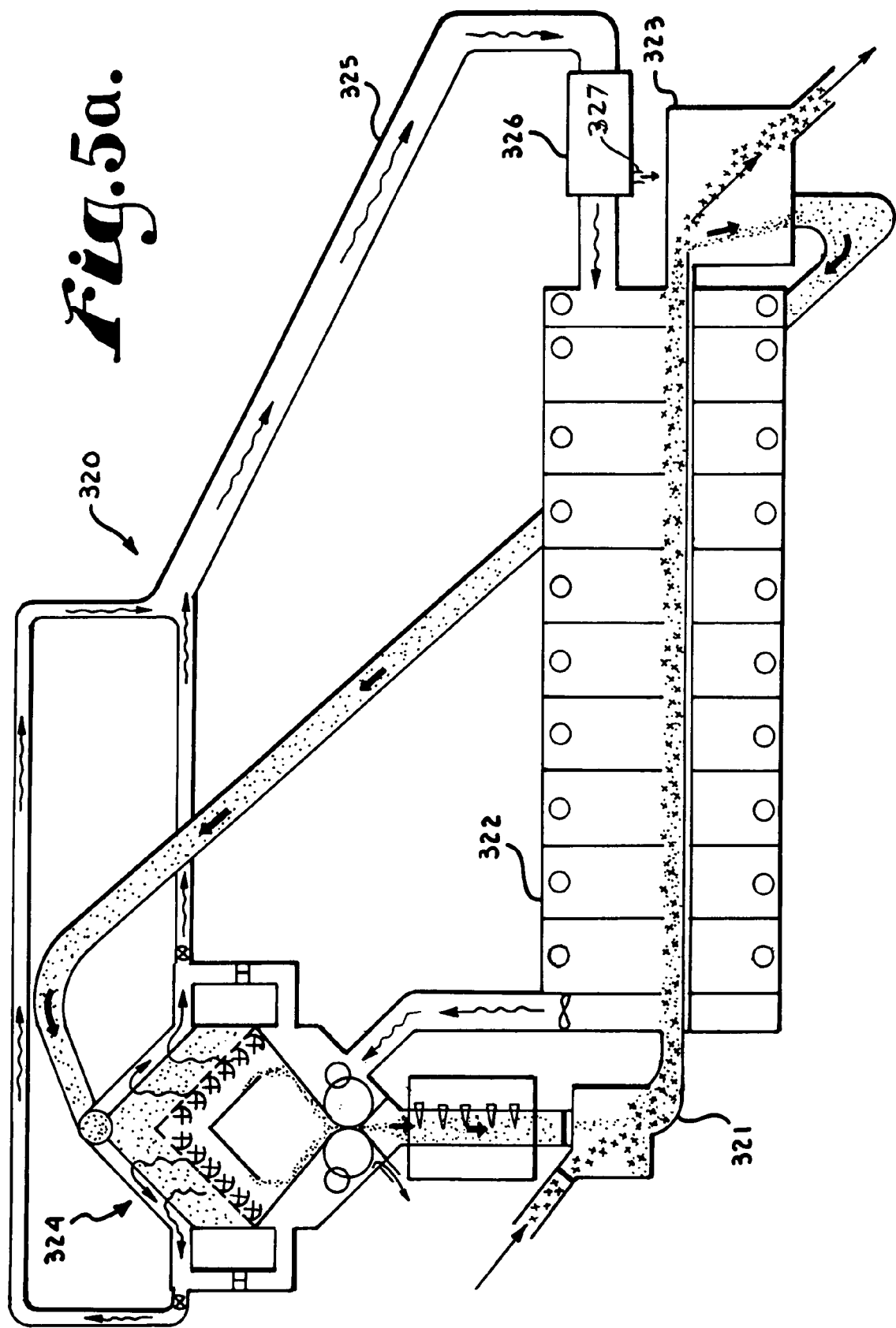

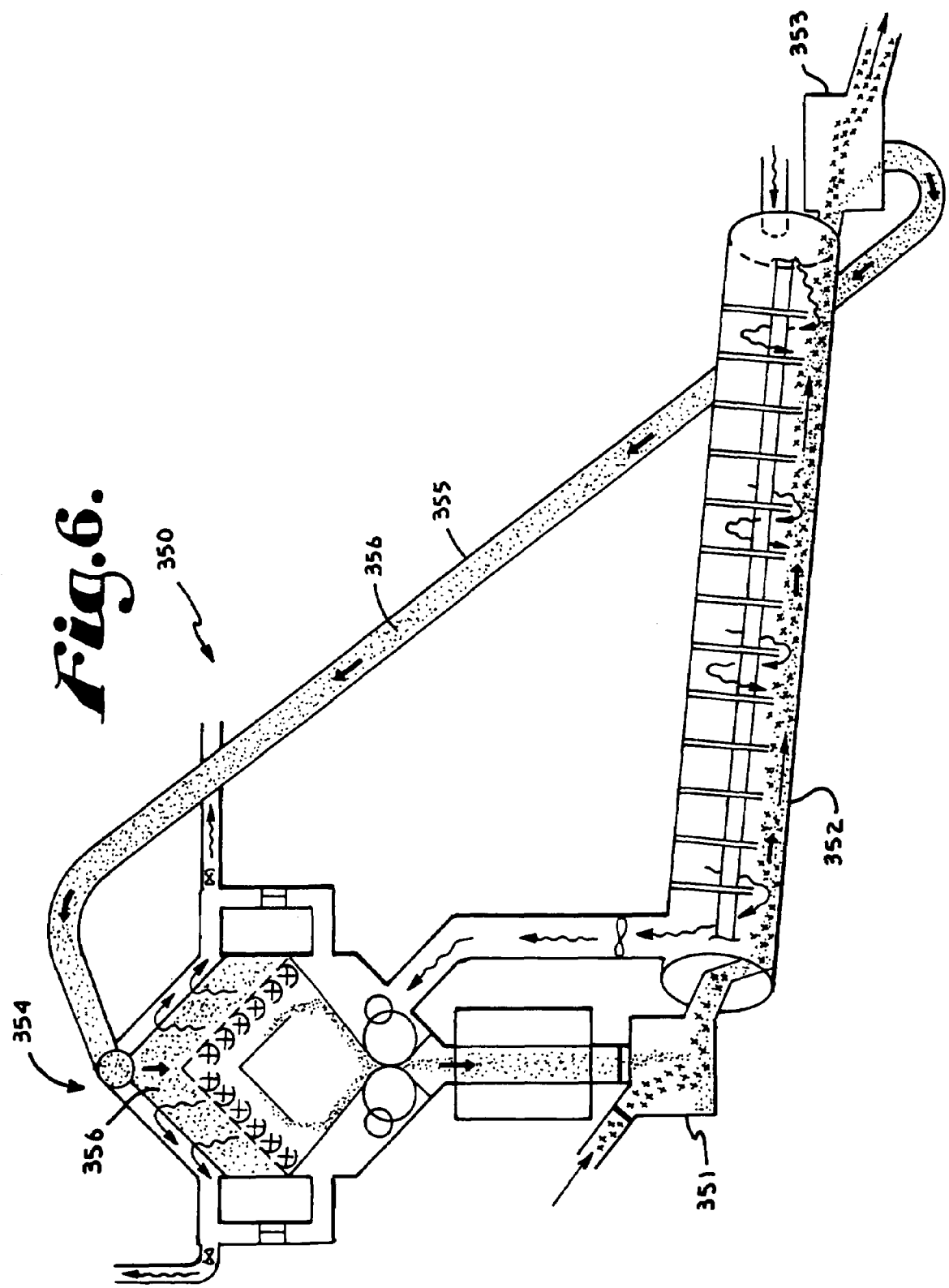

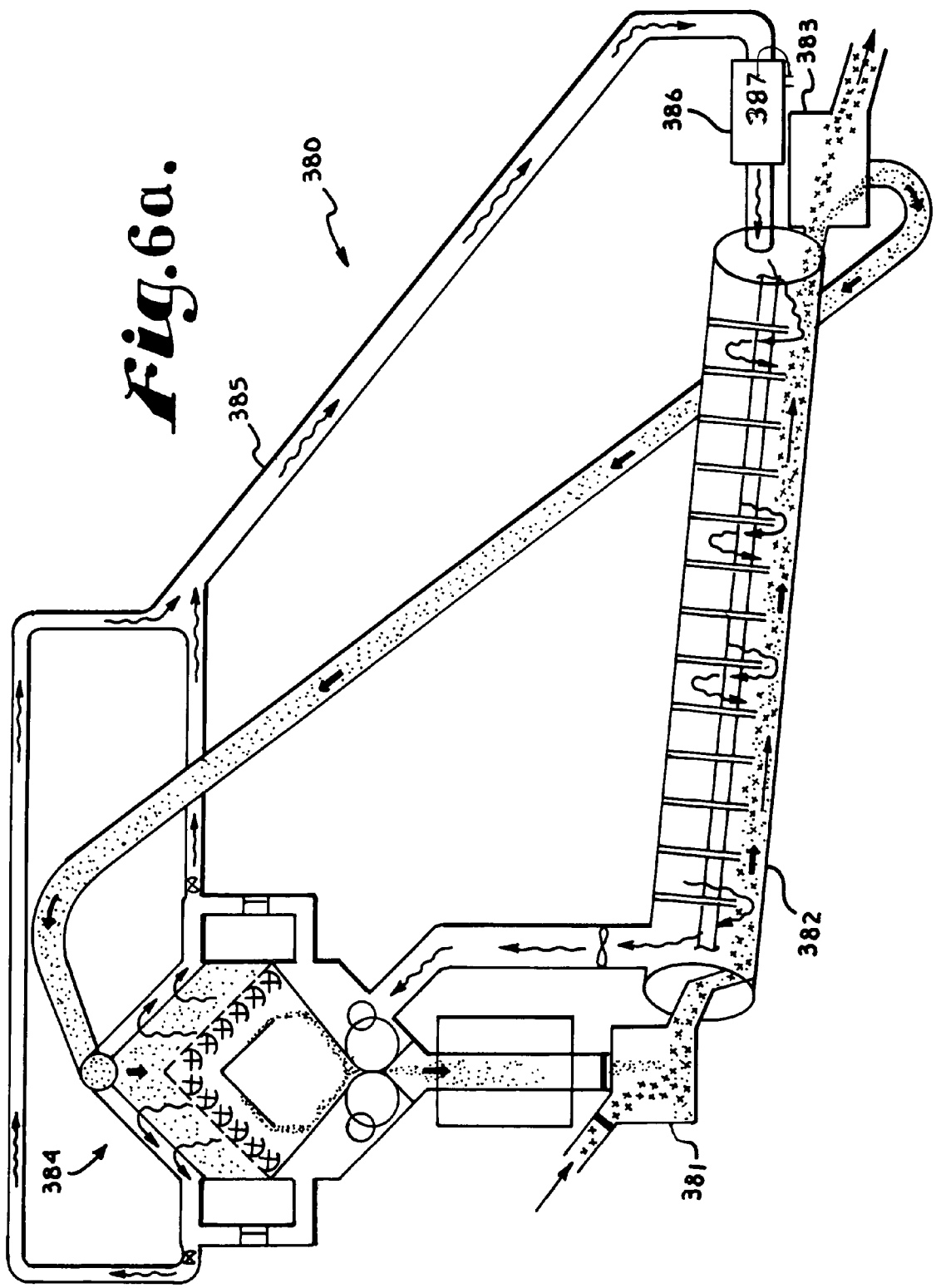

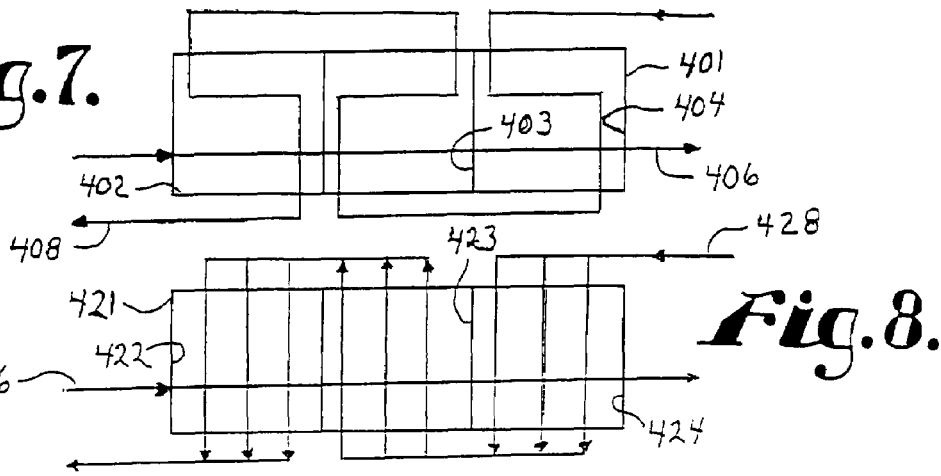
Fig.7.
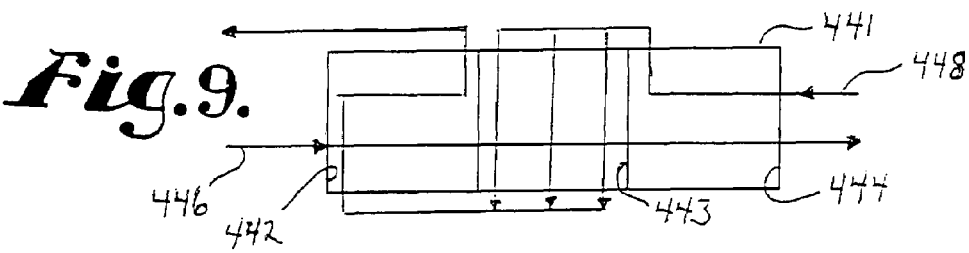
Fig.8.
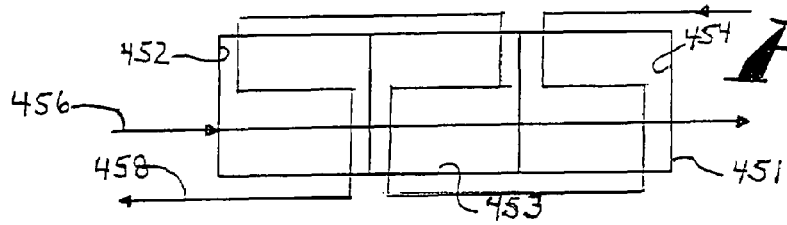
Fig.9.
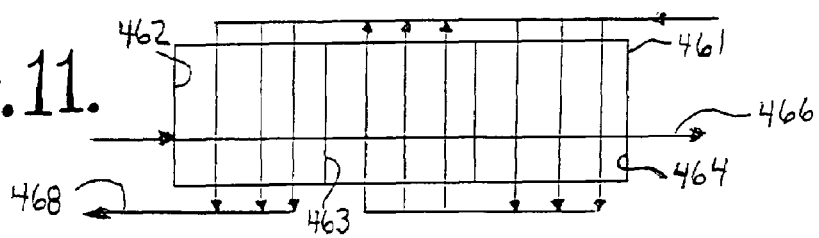
Fig.10.
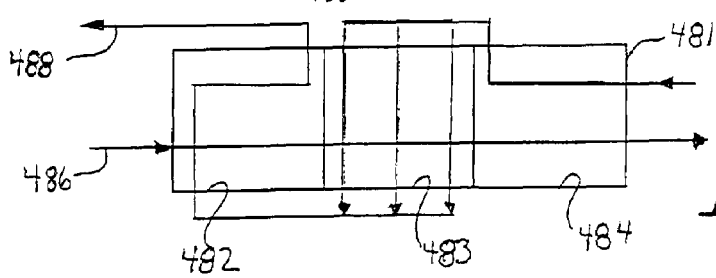
Fig.11.
Fig.12.

COUNTER FLOW COOLING DRIER WITH INTEGRATED HEAT RECOVERY

CROSS REFERENCE TO RELATED APPLICATIONS

This application claims the benefit of U.S. Provisional application No. 60/834,125 filed Jul. 28, 2006 and U.S. Provisional application No. 60/899,964 filed Feb. 7, 2007 which are incorporated herein by reference.

STATEMENT REGARDING UNITED STATES GOVERNMENT SPONSORED RESEARCH OR DEVELOPMENT

The present invention was at least in part made with support from the United States Government under Contract No. DE-FC36-01G011037 awarded by the Department of Energy. The United States Government has certain rights in the invention.

BACKGROUND OF THE INVENTION

The present invention is directed to improvements in driers and methods of drying used to dry various materials, including newly harvested grain, wood pellets, etc. and, in particular, to driers that recover and utilize a comparatively high percentage of the energy used in the drying process.

The drying industry is very large and utilizes significant amounts of both fossil fuels and electricity to dry various materials. While the grain industry is not the only industry that requires significant drying, it is indicative of the problems that exist. Just the U.S. corn crop amounts to almost nine billion bushels annually.

Moisture must be removed in order to allow the grain to be stored without significant loss due to mold, mildew and rot caused by excess retained moisture.

In theory, each pound of water removed from the grain has a latent heat of vaporization of about 1160 British thermal units (Btu's) per pound. In a highly effective dryer system, the dryer could import exactly this theoretical amount of energy per pound of water to be removed from the grain. In reality, the grain also takes on sensible heat and raises in temperature during the process, the flow of heating gas is not uniform, the grain is often heated more on one side of the dryer than the other, etc., such that the efficiency of all types of conventional driers is comparatively low. Cross flow grain driers normally require approximately 2800 Btu per pound of water removed versus the theoretical amount of 1160 Btu per pound.

Because the corn industry in the U.S. consumes approximately 900 million gallons of propane and over 3200 million kilowatt-hours of electricity per year just to dry the corn and because this produces nearly two million tons of carbon dioxide exhaust gases per year, it is seen that any improvement in drying efficiency can amount to significant savings in fuel, energy and emissions. Corn is only one type of grain that must be dried. Further, there are many other solids, semi-solids and initially liquid compositions that are dried each year by vaporizing a liquid component or completely evaporating most or all of an incoming stream, at considerable costs in terms of fuel, energy and undesired emissions due to combustion of the fuels.

It is further noted that for some materials the manner of drying is important to prevent excessive shock to the product being dried and/or to reduce inconsistency in the dried material. For example, grain kernels can be cracked by cooling or heating too quickly, which can lead to degradation of the grain. While conventional driers may provide a chosen average moisture content, the content may not be consistent. Consequently, problems are encountered in many types of conventional cross flow grain driers where, the grain is heated and dried by air passing perpendicularly to the flow of the grain. In such driers, the grain on one side of the dryer that first encounters the heated air is overly dried and may be dried too quickly or cooled too quickly so as to cause cracking and the grain on the opposite or on air discharge side tends to be too wet. Therefore, it is also desirable to provide a dryer that provides consistent, uniform and non stressful heating to drive off moisture and thereafter uniform and non stressful cooling.

In some circumstances, it is also desirable to provide a closed recycle system for gas used in the drying process to reduce dust or other undesirable emissions.

SUMMARY OF THE INVENTION

A dryer wherein an incoming material, especially a granular, pelletized or other material, having removable moisture or other removable fluid therein that is to be removed by drying is generally uniformly mixed with a heated medium, in particular, a particulate medium, to form a mixture that is hotter than the incoming material to be dried and, thereafter, allowed to flow through a drying chamber from an entrance to an exit thereof. A cooling fluid, preferably air that is ambient or recycled, if exhaust emissions are of a concern, is counterflowed through the mixture from near the mixture exit to near the mixture entrance, such that the cooling fluid is heated by the mixture during passage through the chamber. As used herein the term cooling fluid refers to a drying fluid that absorbs and removes liquid, preferably mostly vapor produced by liquid to gaseous phase change, from a material to be dried. Sensible heat transfers from the heated media to the material to be dried and vaporizes the moisture or other liquid to be removed from the material, preferably by phase change. The fluid during passage through the chamber absorbs the moisture or vapor released from the material to be dried, so as to become fully saturated or, at least partly saturated as the fluid exists the chamber. In this manner, the fluid dries the material principally by phase change of the liquid that was originally contained in or on the incoming material to be dried. There is also normally cooling the material across a temperature gradient of cool to hot from near the material exit to near the material entrance.

At the chamber exit, the media (now comparatively cool) is separated from the material to be dried, by a separator, such as an air flow separator, a magnetic separator or especially a physical size separator such as a sizing screen that allows passage of one, but not the other. For this invention, the media can be larger or smaller than the material to be dried, when a screen is used. Other separation techniques are foreseen possible, especially where the components of the mixture are of the same size.

The material which at the discharge of the separator is comparatively drier than before entering the drier is then transferred to storage or the like. The media, which at the discharge preferably has been cooled by passage through the chamber, is then transferred back to the entrance to be mixed with the incoming material to be dried. Along the transfer, the fluid which is heated and at least partially saturated with moisture subsequent to exiting the chamber is counter flowed past the media in a regenerator, so that the media is at least partially reheated. This allows the recovery of both sensible and latent heat from the fluid by the media.

Because the media is relatively cool and the fluid is hot and at least partly saturated with moisture or other condensible liquid, as the fluid cools during the media heating process, moisture or other liquid condensate forms on the media that is collected and withdrawn. In some instances, a blow off system is applied to the heated media wherein recycled process air or another gas is blown past the media after heating by the fluid to remove condensate adhering to the media. Prior to mixing with the incoming material to be dried, the partially heated media is passed through a makeup or supplemental heater that further heats the media to a preselected temperature that is determined to be best for mixing with the incoming material to be dried.

In certain embodiments, the various fluid streams are collected, especially the gas that exits the regenerator, is collected and returned to the drying chamber for recycle or repassing through the mixture therein. Because the fluid that is recycled in this manner may in some cases be somewhat hotter than the fluid at the beginning of the process initially (for example, ambient air), an intermediate chiller may be utilized to cool the fluid to a preselected temperature before flowing into the mixture in the chamber. In this manner, the fluid is not exhausted to the atmosphere, so as to reduce dust or other undesirable emissions.

The media may be any suitable material that can function to become heated and convey such heat to the material to be dried. Such media could include rocks, ceramic or glass balls or other shapes, pieces formed of metal or the like. Preferably, the media is stable and not significantly damaged by recycle usage. When used with foodstuffs, such as grain, the media must be food safe.

Therefore, the basic process in general is to mix a material to be dried with a media that is preheated with recovered or reclaimed sensible and latent heat to form a mixture and allow that mixture to pass in a first direction through a chamber. A comparatively cool fluid, especially a gas such as air, is counter flowed in the opposite direction through the mixture in the chamber so that the material is first heated by the media and then cooled or the energy state is changed by latent heat release associated with the phase change of the liquid to be removed while being dried by the fluid. The comparatively cool dry media and dry material are separated. The heated and moisture carrying fluid is then counter flowed past the separated media and condensate is removed, so that the media is at least partly reheated. The partially heated media is then further heated by a makeup heater and returned to the incoming material to be dried to form the mixture therewith. The process, therefore, first heats the material to be dried and then dries the material by flowing cooling and drying fluid (generally referred to as cooling fluid herein) therethrough. The incoming comparatively cool and dry fluid becomes heated and removes moisture vaporized or evaporated from the material to be dried as the fluid passes through the chamber. Much of the sensible and latent heat utilized to drive moisture from the material is recovered and reused by this overall process and especially by the reheating of the media by the fluid exiting the chamber, thereby requiring comparatively little supplemental heat input into the media after being heated by the hot fluid.

While principally counter current flow processes are described above and preferred, both with respect to the drying of the material and the reheating of the media, it is foreseen that some processes may be at least partially counter flow, cross-flow, concurrent flow or mixtures thereof. Further the processes may have individual sections that are cross flow, counter flow, concurrent flow or mixtures of such flow, but which are overall counter current flow. The process could also be conducted in sequential steps wherein a certain amount of moisture is removed in each step, including wherein there are multiple drying chambers that each reduce moisture a given amount in sequence wherein the cooling fluid from all the chambers uses a single regenerator.

OBJECTS AND ADVANTAGES OF THE INVENTION

Therefore, the objects of the invention are: to provide a dryer that is especially effective in drying material with comparatively smaller outside energy input; to provide such a dryer that is effective in uniformly and consistently drying materials; to provide such a dryer that initially forms a heated mixture of the material to be dried by mixing with a heated media which is then passed through a drying chamber in counter flow relation to a fluid, such as air, that is initially comparatively cool and that is heated and at least partially saturated with moisture as the fluid passes through the mixture; to provide such a dryer wherein the media, when comparatively cool, is separated from the now comparatively dry and cool material and counter flow heated by the hot fluid exiting at the material entry to the chamber and, thereafter, the media is heated by a supplemental heater to a preselected temperature; to provide such a dryer that can be converted to allow enclosed recycle of the fluid to reduce undesirable emissions; to provide such a dryer that has a comparatively high efficiency wherein comparatively little heat is required from an external source such as fuel, in comparison to conventional driers; and to provide such a drier that is easy to use, economical to build and operate and especially well adapted for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a partially schematic view of a drier in accordance with the present invention having a vertical drying chamber.

FIG. 1A is a drier similar to that of FIG. 1 having a fluid recycle system and a fluid chiller.

FIG. 2 is a partially schematic view of a first modified drier in accordance with the present invention having a fluidized bed drying chamber.

FIG. 2A is a drier similar to the drier of FIG. 2 having a fluid recycle system and a fluid chiller.

FIG. 3 is a partially schematic view of a second modified drier in accordance with the present invention having a rotary drum drying chamber.

FIG. 3A is a drier similar to the drier of FIG. 3 having a fluid recycle system and a fluid chiller.

FIG. 4 is a partially schematic view of a third modified drier in accordance with the present invention having a vertical drying chamber and a cross flow media supplemental heater.

FIG. 5 is a partially schematic view of a fourth modified drier in accordance with the present invention including a fluidized bed drying chamber and a cross flow media supplemental heater.

FIG. 5A is a drier similar to the drier of FIG. 5 including fluid recycle and a fluid chiller.

FIG. 6 is a partially schematic view of a fifth modified drier in accordance with the invention showing a rotary drum drying chamber and a cross flow media supplemental heater.

FIG. 6A is a drier similar to the drier of FIG. 6 including fluid recycle and a fluid chiller.

FIG. 7 is a schematic diagram of a further alternative drying chamber wherein a mixture to be dried enters one end of the chamber and a cooling fluid flows generally overall counterflow to the mixture, but in stages flows concurrently with the mixture.

FIG. 8 is a schematic diagram of a still further alternative drying chamber wherein a mixture to be dried enters one end of the chamber and a cooling fluid flows generally overall counterflow to the mixture, but in stages flows cross flow relative to the mixture.

FIG. 9 is a schematic diagram of a yet further alternative drying chamber wherein a mixture to be dried enters one end of the chamber and cooling fluid flows generally overall counterflow to the mixture, but in stages the cooling fluid flows in mixed flow patterns relative to the mixture.

FIG. 10 is a schematic of a further alternative regenerator wherein media to be heated enters from one end and comparatively hot fluid flows overall generally counterflow to the media, but in stages the fluid flows concurrently with the media.

FIG. 11 is a schematic of a still further alternative regenerator wherein media to be heated enters from one end and comparatively hot fluid flows generally overall counter currently to the media, but in stages the fluid flows in cross flow through the media.

FIG. 12 is a schematic of a yet further alternative regenerator wherein media to be heated enters from one end and comparatively hot fluid flows generally overall counter current to the media, but in stages fluid flows in mixed flow patterns relative to the media.

DETAILED DESCRIPTION OF THE INVENTION

Figure 4A:
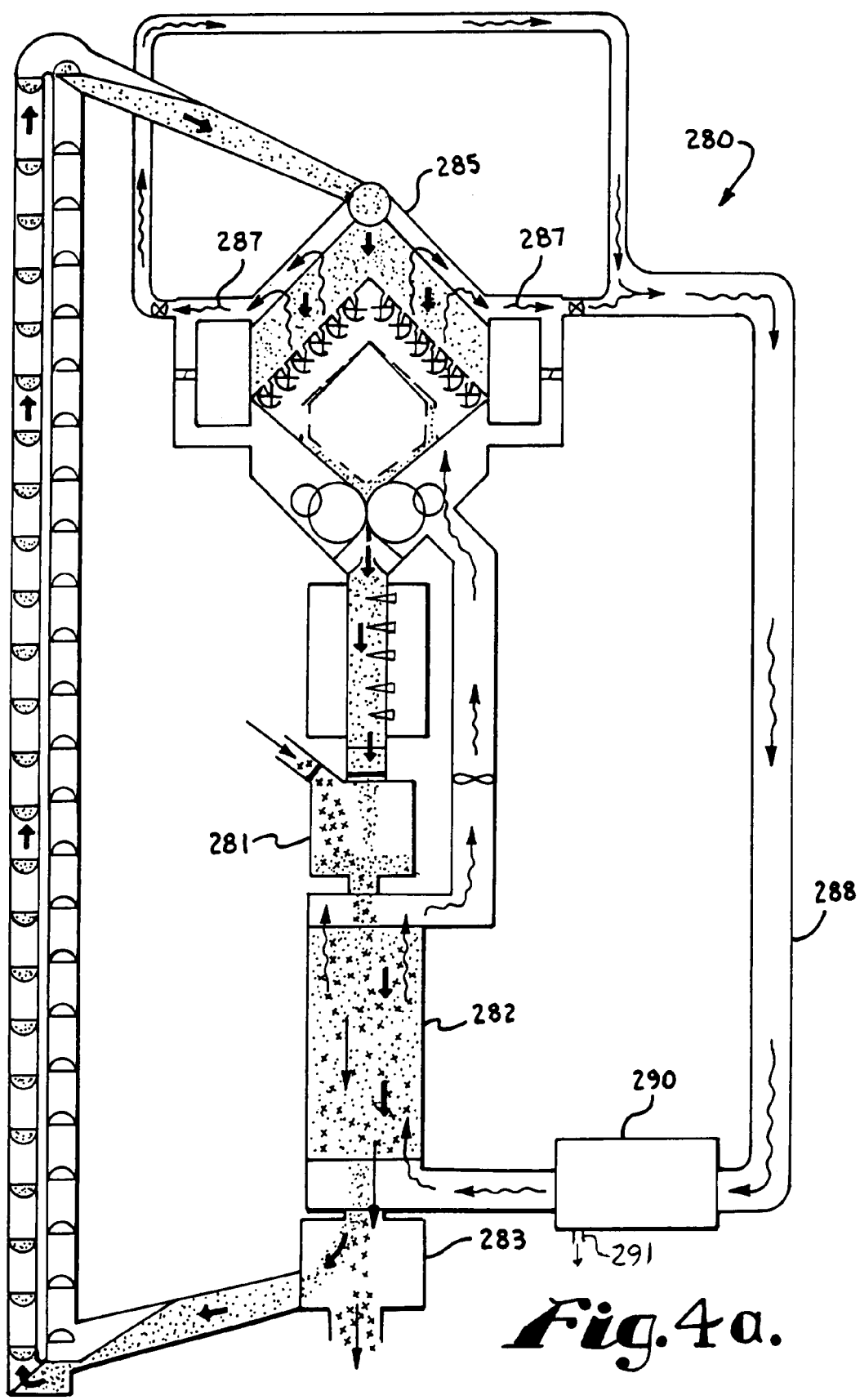
FIG. 4A is a drier similar to the drier of FIG. 4 having a fluid recycle system and a fluid chiller.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As shown in FIG. 1, the reference numeral 1 generally represents a drier in accordance with the present invention.

The drier comprises an inlet mixer 5 (that also functions to provide a heating zone or sweatbox), a drying chamber 6, a separator 7 and a regenerator system 8.

A material 12 to be dried (here corn) is fed at the arrow numbered 13 into the mixer 5 from a source outside the drier 1. At the same time a media 14 (here smooth rock of approximately one half inch diameter and larger) that has been heated is also fed into the mixer 5 and the media 14 and material 12 are subsequently mixed by flow into the mixer 5 and/or by use of an alternative agitator to form a generally uniform mixture 16 of material 12 and media 14. In the present embodiment, the mixture 16 has enough residence time in the mixer 5 to preferably approach thermal equilibrium at a common temperature. The heat transfer process in the mixer 5 will also preferably cause the material 12 to start to give off moisture or sweat in response to being heated by the media 14.

The mixture 16 discharges through a lower opening 17 into a top 18 of the chamber 6. Airlocks 19 and 20 are provided whereat the material 12 and media 14 enter the mixer 5. The chamber 6 can be round, square, rectangle, or other shapes and herein is approximately square in cross section and is preferably insulated to reduce heat loss. It is foreseen that in some embodiments the chamber 6 may be wider than thick or may be a modified conventional round grain bin. The chamber 6 includes a fluid collection manifold 21 that is perforated to allow the fluid to flow into the manifold 21 after passage through the chamber 6.

The chamber 6 of the illustrated embodiment is vertically higher or taller than wide and is joined at the bottom to a separator 7 that includes a screen 23 that effectively separates the cool and dry media 14 at the bottom of the chamber 6 from the material 12. The separated material 12 exits the drier 1 relatively cool and comparatively drier than when the material 12 entered the chamber 6. When drying most materials that absorb liquids, it is preferably that the fluid be a gaseous fluid, typically air, but other types of fluids are also effective, especially nitrogen where there is a high explosive risk, in the presence of oxygen, provided that such fluids permit the absorption and condensation of water vapor or other substance to be dried from the material 12. A fluid dispenser manifold 25 extends across the lower end 26 of the chamber 6 in such a manner as to allow flow of fluid (indicated by arrows 29) through perforated walls into the chamber 6 and through the collected mixture 16 therein. The mixture 16 flows between elements of the manifolds 21 and 25 which includes perforations for receiving and discharging fluid 29 (here air).

The regenerator system 8 includes a conveyor 32 that operably joins with the separator 7 so as to receive media 14 therefrom and transport the relatively cool dry media to a regenerator 34. The conveyer 32 is rotated by a motor not shown. While the conveyor of the present embodiment is located between the regenerator and the separator, it is foreseen that the conveyor could be located between the regenerator and mixer, that it could be centrally located or that it could be divided into sections on either side of the regenerator. The regenerator could also perform the function of the conveyor in some embodiments.

The regenerator 34 has a tube 35 aligned at an angle with the horizontal and an interior belt conveyor 37, driven by a motor not shown, that has a series of media receiving pans or buckets 38 that receive the media 14 from the conveyor 32 and that are mounted on a continuously rotating belt 40. It is foreseen that a cable or the like could also be used to move the buckets. It is also foreseen that the regenerator could have a wide range of inclination or none relative to the horizontal in some embodiments, provided that condensate can be collected and drained therefrom. The buckets 38 are constructed of a screen mesh that is sized to hold the media 14, but allows passage of fluid 29 therethrough. Most of the buckets 38 that are shown raising in the regenerator 34 are full of media 14 and the ones going down on the opposite side are empty.

The manifold 21 is flow connected by a conduit 44, having a driving fan 45 therein, with an intermediate location along the regenerator 34. It is foreseen that fan can be also located at the entry to the chamber so as to act as a pusher. The conduit 44 opens at outlet 46 into the tube 35 so that fluid (here indicated by arrow 47) flows into the tube 35 counter flow to the movement of the pans 38 and eventually out a fluid discharge 48. Suitable airlocks are provided in the regenerator 34 to direct flow of fluid therethrough.

In a final drying and heating region 51, a small side arm 50 of the conduit 44 directs a small slip stream of the fluid indicated by the arrow 54 out a secondary fluid discharge 55 into the atmosphere. The slip stream 54 is used for the drying or blow away removal of surface moisture and heating of the media 14 and is a small percentage of the overall fluid flow, preferably less than 5% by volume. Such a slip stream 54 works best when the fluid is not fully saturated.

Located between the conduit outlet 46 and the slip stream 54 is a water blow off system 56 that includes a fan 58 to recycle gaseous fluid at a higher velocity past the media 14 to blow beaded moisture or other liquid from the media 14.

Subsequent to the drying and heating region 51, the media 14 enters a supplemental heating region 63. A sensor 64 measures the temperature of the media at the exit thereof and compares the exit temperature to a preselected desirable temperature. A heater 65 is located in the heating region 63 along with a fan 66 that blows fluid past the heater 65 and through the media 14 in the region 63 in response to the actual temperature at the sensor 64 being below the preselected temperature. The preselected temperature is selected for the particular material being dried. For example, the preselected temperature is preferably in a range from 180° to 240° F. for many materials to be dried. For some, the preferred temperature may be higher or lower. For corn, it is preferred that the temperature of the mixture exiting the mixer 5 be in the range from 160° F. to 190° F. Upon startup additional heating by the heater 65 is normally required to bring the media 14 up to temperature, since the media 14 on a cold startup will not be preheated by the fluid exiting the chamber 6. It is foreseen that the heater 65 may utilize many different types of energy, including natural gas, propane electrical resistance, microwave, oil, biofuel and the like.

The media 14 is dumped from the buckets 38 as such leave the heating region 63 into a chute 69 that collects heated media (indicated by the arrow 70) at the bottom thereof and delivers the heated media 70 to the mixer 5. The regenerator 8 is provided with suitable access locations, not shown, to allow the initial supply of media 14 or makeup media 14 thereto and for maintenance.

In use, the wet material 12 enters the mixer 5 through an airlock 19 and is mixed with comparatively hot media 14 to form mixture 16. The mixture 16 flows into and downwardly through the chamber 6 while the initially cool fluid 29, preferably air at ambient air temperature or about 70° F., flows upwardly in counter flow through the mixture 16. The mixture 16 becomes cooler and drier as it drops lower in the chamber 6 and the fluid 29 becomes hotter and more saturated with moisture as it raises in the chamber 6. The media 14 is separated from the material 12 in the separator 7 and transported to the bottom of the regenerator 34. The material 12, preferably now about the same temperature as prior to entering the drier 1, but comparatively drier, is delivered to storage or transferred to a different location or in some embodiments directed to another pass through the drier 1, if necessary.

The comparatively cool dry media 14 is loaded onto the buckets 38 of the conveyor 37 and passes in counter flow to the comparatively hot and at least partially saturated main stream of fluid that has exited the chamber 6. The media 14 thereby becomes hotter and moisture or other liquid condenses on the media 14 and migrates to the bottom surface of the tube 35. The moisture flows down the bottom surface of the tube 35, here due to the inclination of the tube 35, and exits the drain 60. After the media 14 passes the fluid conduit outlet 46, it is blown dry by the blow dry region 56, thereafter enters the drying and heating region 51 with a concurrent flow of a small slip stream of fluid and thereafter is supplementally heated in the heating region 63 to the preselected temperature, here 210° F.

Thereafter, the heated and relatively dry media 14 is mixed with the incoming material 12 in the mixer 5 and the cycle continues until all material 12 is dried to a selected moisture content that is chosen for the particular material 12 to be dried.

Shown in FIG. 1A is drier 80 that in many ways is quite similar to drier 1. Consequently, only major elements and the elements that are different are discussed in detail. Reference is made to the description of drier 1 for the remainder of the description of drier 80.

Drier 80 includes a mixer 81, a drying chamber 82, a separator 83 and a regenerator 84.

The principal difference in the drier 80 as compared to the drier 1 is that conduits 87 and 90 are provided to collect fluid exiting the regenerator 84 at outlets 91 and 92 respectfully. The conduits 87 and 90 join in a common manifold 95 that recycles the fluid indicated by flow arrows 97 back to a lower chamber manifold 99 for distribution through a perforated fluid dispenser 100 into a mixture 101 in the chamber 82. Located along the manifold 95 is a chiller 105 of conventional refrigeration unit construction, including commercial air condition units, refrigeration units, heat exchanger with ambient air, heat pumps and similar devices, having a condensate drain 106 utilizing a heat exchanger and air cooling unit (not shown) to cool the fluid in the manifold 95 to a preselected temperature, for example 70° F. The purpose of the chiller 105 is to return the fluid 97 to essentially the same starting temperature and to adjust the dew point temperature of the fluid 97 at the bottom of the chamber 82 for each cycle thereof, so that the fluid 97 does not increase somewhat in temperature with each cycle. It is foreseen that the chiller could be located other places in the system and perform an equivalent function, such as along a conveyor 104 that conveys media 115 between the separator 83 and regenerator 84, so as to remove a small amount of heat by condensing liquid at such location. It is foreseen that the heat from the chiller 105 could be conserved and used to help preheat the media 115. It is also foreseen that the chiller could be a heat pump or other suitable device for removing heat and that such heat could be returned to the drier 80 for use in heating the media 115 or the mixture 101 or the like.

Shown in FIG. 2 is a drier 120. The drier 120 is similar to the previous described drier 1 and portions that are the same are not described again in detail, but rather reference is made to the description of drier 1.

Drier 120 has a mixer 123, a drying chamber 124, a separator 125 and a regenerator 126. The principal difference here as compared to drier 1 is that the vertical column drying chamber of drier 1 has been replaced with a horizontal fluidized bed chamber 130. The chamber 130 has a perforated floor 132 suspended therein which receives a mixture 133 of material 134 to be dried and heated media 135 from the mixer 123. The chamber 130 has an enclosed outer wall 137 from which suspend a series of spaced upper and lower fluid flow directing baffles 139*a* and 139*b*. A series of upper ports 140 is connected to a series of lower ports 141 by conduits 142 having a driving fan 143 therein that circulates fluid in the portion of chamber 124 that is located between each associated or adjacent pair of baffles 139*a* and 139*b*, such as represented by the arrows 145 from ports 140 to ports 141 and through the floor 132 to fluidize a mixture bed 144 thereon. In this manner, fluid represented by arrow 147 passes through the fluidized bed 144 and is moving counter flow to the mixture 133, while at the same time a significant flow of fluid 145 is being flowed upwardly through the bed 144. The mixture bed 144 is fluidized and flows generally to the right as seen in FIG. 2. Where needed, the floor 132 may be slanted toward the outlet, an open grid chain can be drawn through the bed 144 toward the outlet or other structure can be used to facilitate movement of the bed 144 over the floor 132.

Shown in FIG. 2A is a drier 160 similar to drier 120 except as described below. The drier 160 has a mixer 161, a fluidized bed drying chamber 162, a separator 163 and a regenerator 164. In drier 160, collection conduits 165 and 166 collect fluid exiting the regenerator 164 at discharge locations 167 and 168 respectively. The conduits 165 and 166 join in a common manifold 170 that is in flow communication with the location 171 whereat the fluid enters the chamber 162 to operably recycle fluid as represented by arrow 172 within a substantially closed system. Located along the manifold 170 is a chiller 174 with a liquid drain 175 for chilling the fluid to a preselected temperature and dew point temperature.

FIG. 3 shows a drier 180 which is similar to drier 1 and includes a mixer 181, a drying chamber 182, a separator 183 and a regenerator 184. The drying chamber 182 differs from that of drier 1 in that it has a rotary drum 185. The drum 185 includes a cylindrical shell 186 that operably rotates and that has a series of spaced suspended stationary baffles 187 that urge the fluid represented by arrows 188 to pass through a rotating mixture 189. The baffles 187 are supported by a shaft 190 that extends through the shell 186. The shaft 190 and baffles 187 do not rotate with the shell 186, so that the flow of fluid 188 is always beneath a bottom 191 of the baffles 187. In the view of FIG. 3, the mixture 189 moves from left to right as the fluid 188 moves from right to left through the drum 185.

FIG. 3A shows a drier 200 that is similar to drier 180 and has a mixer 201, drying chamber 202, a separator 203 and a regenerator 204. The drier 200 differs from drier 180 in that it includes a fluid collection and return manifold system 206 with collection conduits 207 and 208 that collects fluid exiting the regenerator 204 and returns the fluid represented by the arrow 205 to the drying chamber 202. The return manifold system 206 also includes a fluid chiller 210 for chilling the fluid to a state having a preselected temperature and dew point temperature with a liquid drain 211.

Shown in FIG. 4 is a drier 240 that is further similar to drier 1 in that it has a mixer 241, a drying chamber 242, a separator 243 and a regenerator 244. The regenerator 244 differs from that of drier 1 in that there is a vertical tower 250 having an internal bucket conveyor 251 that conveys media 252 from a lower end 253 to an upper end 254 thereof and discharges the media 252 into a hopper and heating chamber 256 that is part of the regenerator 244. The media 252 in the heating chamber 256 is located above a series of rotating gates 257 that feed the media 252 therethrough by gravity. Fluid indicated by arrows 260 and driven by fan 261 upon exiting the chamber 242 is conveyed by a manifold 262 to beneath the gates 257 so that the fluid which is hot passes through the gates 257 and lower structure of the heating chamber 256, so as to heat the media 252. Subsequently, the media 252 collects at the chute 265 and passes through a pair of rotating foam rollers 267 at nip 268 which function to substantially remove the moisture condensed on the media 252. Squeegees 270 operably squeeze water from the rollers 267. Collected moisture indicated by the arrow 269 exits at drain 271.

A secondary or supplemental cross flow heater 272 provides additional heating to the partially heated media 252 to bring it to a desired or preselected temperature. Bypass plenums 274 have control dampers 275 therein and allow bypass flow of fluid on startup to initiate the drying process. Alternatively, it is foreseen that the fan 261 could be stopped during startup.

Drier 280 is shown in FIG. 4A and includes a mixer 281, drying chamber 282, separator 283 and regenerator 285. The drier 280 is like drier 240 except the fluid exiting the regenerator 285 and indicated by arrows 287 is collected in a manifold 288 and returned to the bottom of the drying chamber 282 in a generally closed loop through a chiller 290 having a drain 291. The chiller 290 being for chilling the fluid to a preselected temperature and dew point temperature.

FIG. 5 shows a drier 300 that is similar to previous fluidized bed drier 120 in part and prior drier 240 in part. In particular, drier 300 includes a mixer 301, drying chamber 302 that provides a fluidized bed 303 of the mixture 304 to be dried, a separator 305 and a regenerator 306 which is similar to regenerator 244 except that media 308 is returned by conveyor 309 for reheating.

Drier 320 of FIG. 5A is similar to drier 300 and includes mixer 321, drying chamber 322, separator 323 and regenerator 324. Drier 320 also includes a manifold 325 collecting fluid exiting the regenerator 324 and returning the fluid to the drying chamber 322 through a chiller 326 for chilling the fluid to a preselected temperature and dew point temperature and having a drain 327.

Shown in FIG. 6 is a drier 350 having a mixer 351, drying chamber 352, separator 353 and regenerator 354. The drying chamber 352 is similar to previously described chamber 182 and the regenerator 353 is similar to that of the previous regenerator 306. A conveyor 355 carries media 356 from the separator 353 to the top of the regenerator 354 for reheating.

Shown in FIG. 6A is a drier 380 that is similar to drier 350 and includes a mixer 381, drying chamber 382, a separator 383 and a regenerator 384. The drier 380 includes a fluid collection manifold 385 with a chiller 386 having a drain 387 to operably return fluid from the regenerator 384 to the chamber 382 at a preselected temperature and dew point temperature.

Shown schematically in FIG. 7 is an alternative drying chamber 401 that has a plurality of compartments 402 to 404, although it is foreseen that any number of multiple chambers could be utilized. A mixture 406 to be dried flows generally from left to right through the chamber 401, passing through each compartment 402 to 404 in sequence. A drying and cooling fluid 408 flows overall generally counter flow to the mixture 406, but in each of the compartments 404 to 402 sequentially the fluid 408 flows concurrently with the mixture 406. Suitable baffles and airlocks are provided to allow the flows. It is foreseen that for some configurations of such a drier that a plurality of individual compartments with fixed sides may not be required, but rather sections or regions may be designed to direct flow.

Shown schematically in FIG. 8 is an alternative drying chamber 421 that has a plurality of compartments 422 to 424, although it is foreseen that any number of multiple chambers could be utilized. A mixture 426 to be dried flows generally from left to right through the chamber 421, passing through each compartment 422 to 424 in sequence. A drying and cooling fluid 428 flows overall generally counter flow to the mixture 426, but in each of the compartments 424 to 422 in sequence the fluid 428 flows cross flow relative to the mixture 426. Suitable baffles and airlocks are provided to allow the flows. It is foreseen that for some configurations of such a drier that a plurality of individual compartments with fixed sides may not be required, but rather sections or regions may be designed to direct flow.

Shown schematically in FIG. 9 is an alternative drying chamber 441 that has a plurality of compartments 442 to 444, although it is foreseen that any number of multiple chambers could be utilized. A mixture 446 to be dried flows generally from left to right through the chamber 441, passing through each compartment 442 to 444 in sequence. A drying and cooling fluid 448 flows overall generally counter flow to the mixture 446, but in each of the compartments 444 to 442 the fluid 448 flows differently with respect to each other. In compartment 444 the fluid 448 flows counter currently with the mixture 446, in compartment 443 the fluid 448 flows cross flow with respect to the mixture 446 and in compartment 442 the fluid 448 flows concurrently with the mixture 446. Such combination of different flow paths is generally referred to herein as mixed flow and it is foreseen that such could be any combination of such flow paths in different compartments. In some instances different or mixed flow paths are combined in the same compartment, such as is shown in FIG. 2 wherein each compartment has both concurrent flow and cross flow of the fluid passing therethrough. It is foreseen that unitary flow paths within individual chambers or other combinations of combined or sequential mixed flows in various chambers may be utilized in certain embodiments. It is foreseen that mixed flows of various combinations may be utilized in different regions or compartments wherein only a single flow path of fluid occurs relative to the media in each separate compartment or certain flow paths can be combined within a single compartment such as counter current and cross flow. Suitable baffles and airlocks are provided to allow the flows. It is foreseen that for some configurations of such a drier that a plurality of individual compartments with fixed sides may not be required, but rather sections or regions may be designed to direct flow.

Shown schematically in FIG. 10 is an alternative regenerator 451. The regenerator 451 has a plurality of compartments 452 to 454, although it is foreseen that any plural number of compartments may be utilized. Media 456 in a comparatively cool state enters the regenerator 451 passing from left to right and flows sequentially through each compartment 452 to 454. A hot fluid 458 flows overall generally counter current to the media 456, but within each of the compartments 454 to 452 in sequence the fluid flows concurrently with the media 456. Suitable baffles and airlocks are provided to allow the flow. It is foreseen that for some configurations of such a drier that a plurality of individual compartments with fixed sides may not be required, but rather sections or regions may be designed to direct flow.

Shown schematically in FIG. 11 is an alternative regenerator 461. The regenerator 461 has a plurality of compartments 462 to 464, although it is foreseen that any plural number of compartments may be utilized. Media 466 in a comparatively cool state enters the regenerator 461 passing from left to right. A hot fluid 468 flows overall generally counter current to the media 466, but within each of the compartments 464 to 462 in sequence the fluid 468 flows cross flow through the media 466. Suitable baffles and airlocks are provided to allow the flow. It is foreseen that for some configurations of such a drier that a plurality of individual compartments with fixed sides may not be required, but rather sections or regions may be designed to direct flow.

Shown schematically in FIG. 12 is an alternative regenerator 481. The regenerator 481 has a plurality of compartments 482 to 484, although it is foreseen that any plural number of compartments may be utilized. Media 486 in a comparatively cool state enters the regenerator 481 passing from left to right. A hot fluid 488 flows overall generally counter current to the media 486, but within each compartments 484 to 482 in sequence the fluid 488 flows in mixed flow relative to the media 486. In particular in chamber 484 the fluid 488 flows counter current to the media 486, in chamber 483 the fluid 488 flows cross flow through the media 486 and in chamber 482 the fluid 488 flows concurrently with the media 486. It is foreseen that mixed flows of various combinations may be utilized in different compartments wherein only a single flow path of fluid occurs relative to the media in each separate compartment or certain flow paths can be combined within a single compartment or region such as counter current and cross flow. Suitable baffles and airlocks are provided to allow the flow. It is foreseen that for some configurations of such a drier that a plurality of individual compartments with fixed sides may not be required, but rather sections or regions may be designed to direct flow.

It is foreseen that the fluid driving mechanism, such as fan 45 of dryer 1 of the first embodiment could be located downstream of the drying chamber (that is, in the fluid path after the fluid exits the chamber) and pull the fluid through the chamber, such as chamber 6 in drier 1 or could be upstream of the chamber (that is, prior to the fluid entering the chamber) and push the fluid through.

It is foreseen that supplemental heat could be added to the drier to make up for losses in the method at many locations. In the embodiments shown, the heat is added subsequent to the heat exchange between the fluid and the media in the regenerator. However, the supplemental heat could be added to the material to be dried, to the media while in the regenerator or to the fluid prior to entering the regenerator and in other ways.

While a continuous counter flow process is described for the chamber and most of the regenerator in the embodiments described, it is foreseen that batch processes could be utilized using one or a series of sequential batch operations. Further, it is foreseen that the flow of fluid into the mixture in the chamber and into the media in the regenerator could be step wise cross flow, step non counter current flow and other flow configurations including mixed configurations wherein each segment or section may encounter one or more different types of flow, but the overall general path of flow of the fluid is counter current to the material to be dried in the chamber.

It is foreseen that the mixture may be conveyed through the chamber and/or the regenerator by other types of systems including, but not limited to, round plate systems, tunnel driers, column driers with flow directing auger especially upward flow column driers, driers using belts to convey mixture therethrough, vibratory inclined plane elevator driers, vibratory spiral elevator driers, modified conventional round bin grain driers, disc driers, screw driers and plough driers, as well as driers of other types especially suitable to the material to be dried and various mixtures of drier type.

It is further foreseen that in the rotary drum embodiments of the drier, that the baffles could be eliminated by making the drum of a relatively narrow cross section so that the fluid flows through the mixture in the chamber.

It is also foreseen that although the embodiments shown are principally directed to removing moisture from a material to be dried, that the process can be used to remove other evaporatable liquids such as solvents or the total vaporization of an incoming fluid as an evaporator. The process of the invention is highly adaptable to any situation where there is a vaporizable and condensible component that can be carried by a carrier or drying (here cooling) fluid so as to be removed from another component or fully evaporated and that thermodynamically saves energy over conventional processes. It is noted that in some chemical processes the component to be removed may not be wasted, but rather recovered for reuse. The latter is especially true in solvent recovery.

It is foreseen that in certain embodiments that the drying chambers of the process may be operated under a partial or full vacuum in order to enhance evaporation of a fluid to be dried from the material to be dried, especially to reduce energy consumption or to increase capacity.

It is foreseen that multiple drying chambers may be utilized with a single regenerator so that fluid from separate chambers all enters the common regenerator and all media also enters the regenerator for reheating. For example, separate compartments or chambers could be spaced and the cooling fluid could pass between the different chambers, or may return to the regenerator after exiting each chamber such as is shown in FIG. 1. With separated chambers, different materials to be dried by use of different feed paths or materials at different moisture content could be dried in separate chambers.

While the illustrated embodiments physically mix the material to be dried with the media, it is foreseen that in some instances the hot media could flow along side the material to be dried, but be separated by perforated walls in which case cooling fluid in a mixture of cross and counter current flow could pass through both whereby the fluid would be heated as well as the material by the media and the fluid would withdraw moisture or other liquids from the material. It is also foreseen that a heated liquid may be flowed in closed tubes passing through the material to be dried and wherein the liquid flows generally concurrent with the material to be dried and a cross flow and counter current flow fluid flows through the material to be dried such that the fluid and the material are heated by the liquid in the tubes which may include heat transfer fins and the like, so that the fluid removes moisture or other liquids from the material to be dried.

While air and nitrogen are the most likely fluids to be used in a process of this type, it is foreseen that other fluids such as argon or the like may be used. Furthermore, while particular materials to be dried have been mentioned herein, it is foreseen that a wide variety of materials may be dried, including particulates and other granular materials, powders, flakes, pastes, slurries, and solids in general. Such materials are not restricted to but may be represented by foodstuffs, such as grains, beans, dog food, mixes, meals and flours; chemicals such as clays, coals, sand; and processed materials, such as paper and the like. Still furthermore, it is foreseen that the media may be chosen from a wide range of materials including, but not limited to, crystals, minerals, salts, sands, metal pellets and balls, pea gravel, ceramic pellets or balls, composite materials such as ceramic or concrete pellets with imbedded iron filings and the like.

It is foreseen that, when a heat pump is utilized to chill inlet air, either recycled or ambient in open looped systems, the energy removed may at least partially be utilized to heat material to be dried and/or media and thereby reduce energy consumption or increase capacity.

It is to be understood that while certain forms of the present invention have been illustrated and described herein, it is not to be limited to the specific forms or arrangement of parts described and shown.

What is claimed and desired to be secured by Letters Patent is as follows:

1. A drier apparatus for drying a material utilizing a media and a fluid comprising:
   a) a drying chamber having first and second ends; said chamber being sized and shaped to operably receive heated material and media near said first end and convey the material and media in a mixture through the chamber; the chamber receiving the fluid in a comparatively cool state near said second end and including fluid flow directing structure to flow the fluid through the mixture such that the fluid becomes heated and at least partly saturated with moisture from the material;
   b) a separator operably separating the mixture as the mixture exits the drying chamber into comparatively cool media and cool material; and
   c) a regenerator for receiving the media from the separator and subsequently transferring the media to the drying chamber; said regenerator being flow connected with heated fluid exiting the drying chamber and receiving the heated fluid so as to heat the media therein using the fluid.

2. The drier apparatus according to claim 1 including:
   a) a supplement heater for adding heat prior to said mixture entering said drying chamber.

3. The drier apparatus according to claim 1 including:
   a) a mixer prior to said drying chamber for mixing material to be dried with the media to form the mixture.

4. The drier apparatus according to claim 1 wherein:
   a) said chamber is a column drier.

5. The drier apparatus according to claim 4 wherein:
   a) said chamber is a downflow column drier.

6. The drier apparatus according to claim 1 wherein:
   a) said chamber is a fluidized bed.

7. The drier apparatus according to claim 1 wherein:
   a) said chamber is a rotary drum.

8. The drier apparatus according to claim 1 including:
   a) flow control structure such that said fluid flows counter flow to said mixture in said chamber.

9. The drier apparatus according to claim 1 including:
   a) conduits joining said chamber and said regenerator such that heated fluid enters said regenerator intermediately therealong and flows counter flow to said media therein.

10. The drier apparatus according to claim 1 including:
    a) a fluid conduit flow joining a fluid discharge end of said regenerator with a fluid receiving end of said chamber, so as to provide for recycling of the fluid from the regenerator to the chamber; and
    b) a chiller located in said fluid conduit adapted to cool the fluid passing through said fluid conduit.

11. The drier according to claim 10 wherein:
    a) the chiller cools the fluid passing therethrough to at least one of a preselected temperature and a preselected dew point temperature.

12. A drier apparatus for drying a material utilizing a media and a fluid comprising:
    a) a mixer sized and shaped to operably receive the material to be dried and the media in a heated state so as to form a heated mixture;
    b) a drying chamber having first and second ends; said chamber being sized and shaped to operably receive said heated mixture near said first end and the fluid in a comparatively cool state near said second end and including fluid flow directing structure to flow the fluid through the mixture such that the fluid becomes heated and at least partly saturated with moisture from the material;
    c) a separator operably separating the mixture as the mixture exits the drying chamber into comparatively cool media and cool material; and
    d) a regenerator for receiving the media from the separator and subsequently transferring the media to the mixer; said regenerator being flow connected with heated fluid exiting the drying chamber and receiving the heated fluid so as to heat the media therein using the fluid:

13. A method of drying a material comprising the steps of:
    a) mixing the material to be dried with a heated media that is hotter than the material to form a heated mixture;
    b) passing the mixture through a drying chamber;
    c) flowing a fluid that is cooler than the heated mixture through the mixture as the mixture passes through the chamber such that the fluid exits the chamber hotter and wetter in comparison to entry of the fluid and the mixture exits the chamber cooler and drier in comparison to entry of the mixture into the chamber;
d) subsequent to the prior step separating the media and material;
e) thereafter reheating the media from the separator using the fluid from the chamber;
f) adding make up heat for heat lost in the method; and
g) thereafter conveying media in a heated state to mix with the material to be dried.

14. The method according to claim 13 wherein:
a) said reheating of the media is principally due to condensing vapor in the fluid so as to recapture latent heat; and
b) removing condensate.

15. The method according to claim 13 including the step of:
a) supplementally heating the media prior to conveying the heated media to mix with the material to be dried.

16. The method according to claim 13 including the step of:
a) supplementally heating the material to be dried prior to mixing with the heated media.

17. The method according to claim 13 including the step of:
a) collecting the fluid subsequent to utilizing the fluid to heat the media and returning the fluid to the chamber.

18. The method according to claim 17 including the step of:
a) chilling the fluid to at least one of a preselected temperature and a dew point temperature prior to returning the fluid to the chamber.

19. The method according to claim 17 including the step of:
a) subsequent to chilling the fluid, returning the fluid to the chamber.

20. The method according to claim 13 wherein:
a) said fluid is counter flowed relative to the mixture in the chamber.

21. The method according to claim 13 wherein:
a) said fluid is step wise cross flowed through the mixture in the chamber while overall flowing counterflow to the mixture.

22. The method according to claim 13 wherein:
a) said fluid is step wise mixed flowed through said mixture while overall flowing counterflow to the mixture.

23. The method according to claim 13 including the steps of:
a) providing a regenerator to operably return separated media to be mixed with the material to be dried; and
b) overall counter current flowing the heated fluid from at least part of the chamber through the media in the regenerator.

24. The method according to claim 23 including the step of:
a) concurrently flowing the fluid step wise through the media.

25. The method according to claim 23 including the steps of:
a) cross flowing the fluid stepwise through the media.

26. The method according to claim 23 including the step of:
a) mixed flowing the fluid stepwise through the media.

27. The method according to claim 23 including the steps of:
a) providing a regenerator to operably convey separated media to be mixed with the material to be dried; and
b) step wise cross flowing the fluid through the media in the regenerator.

28. The method according to claim 13 including the step of:
a) providing a vertical column as said chamber and flowing said mixture through said column.

29. The method according to claim 28 including the step of:
a) flowing said mixture downwardly through said column.

30. The method according to claim 13 including the steps of:
a) fluidizing the material while in the chamber; and
b) overall counter current flowing the fluid through the fluidized mixture.

31. The method according to claim 13 including the steps of:
a) providing a rotary drum as the chamber; and
b) flowing the fluid through the mixture while the mixture is rotating in the rotary drum.

32. A method of drying materials comprising the steps of:
a) mixing a first material to be dried with a heated media that is hotter than the material to form a heated mixture;
b) passing the mixture through a drying chamber;
c) flowing a fluid that is cooler than the heated mixture through the mixture as the mixture passes through the chamber such that the fluid exits the chamber hotter and wetter in comparison to entry of the fluid and the mixture exits the chamber cooler and drier in comparison to entry of the mixture into the chamber;
d) subsequent to the prior step separating the media and material;
e) thereafter reheating the media from the separator using the fluid from the chamber;
f) adding make up heat for heat lost in the method; and
g) thereafter returning media in a heated state to mix with a selected one of the first material to be dried and a second material to be dried.

33. In a drying process wherein a material is to be at least partially dried, the improvement comprising the steps of:
a) mixing the material with a hot particulate media to form a heated mixture;
b) passing the mixture through a chamber in overall general counter flow relative to a fluid that enters the chamber cooler than the heated mixture enters the chamber;
c) stepwise flowing the fluid through the mixture in a flow selected from counter current flow, concurrent flow, cross material flow, mixed flow and combinations thereof.
d) removing the mixture from the chamber and separating the media from the material to provide separated media;
e) removing the fluid from the chamber and utilizing the removed fluid to reheat the separated media;
f) adding heat to the drier to increase the temperature of the mixture prior to entering the chamber to a preselected temperature; and
g) returning the reheated media to mix with incoming material to be dried.

34. A method of drying a material comprising the steps of:
a) mixing a first material to be dried from a first material to be dried from a first flow stream with a heated media that is hotter than the first material to form a first heated mixture;
b) passing the first heated mixture through a first drying chamber;
c) flowing a fluid that is cooler than the first heated mixture through the first heated mixture as the first heated mixture passes through the first drying chamber such that the fluid exits the first drying chamber hotter and wetter in comparison to entry of the fluid and the first heated mixture exits the first drying chamber cooler and drier in comparison to entry of the first heated mixture into the first drying chamber;
d) subsequent to the prior step, separating the media and the first material;
e) thereafter reheating the medial fro the separator using the fluid from the first drying chamber;

f) adding make up heat for heat lost in the method;
g) thereafter mixing a second material to be dried from a second flow stream with the reheated media that is hotter than the second material to form a second heated mixture; and
h) passing the second heated mixture through a second drying chamber, the second drying chamber being in a serial relationship with the first drying chamber with respect to the flow of the media.

35. The method of claim 34, wherein the first material and the second material are different types of material.

36. A method of drying a material comprising the steps of:
a) mixing the material to be dried with a heated media that is hotter than the material to form a heated mixture;
b) passing the mixture through a drying chamber;
c) flowing a fluid that is cooler than the heated mixture through the mixture as the mixture passes through the chamber such that the fluid exits the chamber hotter and wetter in comparison to entry of the fluid and the mixture exits the chamber cooler and drier in comparison to entry of the mixture into the chamber;
d) subsequently separating the media and material;
e) thereafter reheating the media from the separator using the fluid from the chamber;
f) adding make up heat for heat lost in the method; and
g) thereafter recycling the reheated media to dry additional material.

37. The method of claim 36, including the steps of:
a) mixing the additional material to be dried with the reheated media that is hotter than the additional material to form the heated mixture; and
b) passing the heated mixture through the drying chamber.

38. The method of claim 36, including the steps of:
a) mixing the additional material to be dried with the reheated media that is hotter than the additional material to form a second heated mixture; and
b) the drying chamber is a first drying chamber and passing the second heated mixture through a second drying chamber, the second drying chamber being in a serial relationship with the drying chamber with respect to the flow of the media.

39. The method of Clam 36, wherein the material and the additional material are different types of material.

40. A drier apparatus for drying a material utilizing a media and a fluid comprising:
a) a mixer sized and shaped to operably receive the material to be dried and the media in a heated state so as to form a heated mixture;
b) a drying chamber having first and second ends; said chamber being sized and shaped to operably receive said heated mixture near said first end and to discharge said mixture in a comparatively cool and comparatively dry state near said second end; said chamber being sized and shaped to operably receive said fluid in a comparatively cool state and including fluid flow directing structure to flow the fluid through the mixture such that the fluid becomes heated and is at least partly saturated with moisture from the material when it exits the drying chamber;
c) a separator operably separating the mixture as the mixture exits the drying chamber into comparatively cool media and cool material;
d) a regenerator for receiving the media from the separator and subsequently transferring the media to the mixer; said regenerator being flow connected with heated fluid exiting the drying chamber and receiving the heated fluid so as to heat the media therein using the fluid; and
e) a heating mechanism operably adding heat to at least one of the media, the material to be dried and the heated mixture.

41. A drier apparatus for drying a material utilizing a media and a fluid comprising:
a) a drying chamber having first and second ends; said chamber being sized and shaped to operably receive and mix the material to be dried and the media in a heated state so as to form a heated mixture near said first end; said chamber being sized and shaped to operably discharge said mixture in a comparatively cool and comparatively dry state near said second end; said chamber being sized and shaped to operably receive said fluid in a comparatively cool state and including fluid flow directing structure to flow the fluid through the mixture such that the fluid becomes heated and is at least partly saturated with moisture from the material when it exits the drying chamber;
b) a separator operably separating the mixture as the mixture exits the drying chamber into comparatively cool media and cool material;
c) a regenerator for receiving the media from the separator and subsequently transferring the media to the drying chamber; said regenerator being flow connected with heated fluid exiting the drying chamber and receiving the heated fluid so as to heat the media therein using the fluid; and
d) a heating mechanism operably adding heat to at least one of the media, the material to be dried and the heated mixture.

42. A method of drying a material comprising the steps of:
a) introducing a first material to be dried and a heated media that is hotter than the material into a mixing and drying chamber;
b) creating a heated mixture of material and media
c) passing the mixture through the chamber
d) flowing a fluid that is cooler than the heated mixture through the mixture as the mixture passed through the chamber such that the fluid exits the chamber hotter and wetter in comparison to entry of the fluid and the mixture exits the chamber cooler and drier in comparison to the initial mixture formed upon its entry to the chamber;
e) subsequent to the prior step separating the media and material;
f) thereafter reheating the media from the separator using the fluid from the chamber;
g) adding make up heat for heat lost in the method; and
h) thereafter returning media in a heated state to mix with a second material to be dried upon entry to the chamber.

* * * * *